(12) United States Patent
Gossweiler, III et al.

(10) Patent No.: US 8,631,440 B2
(45) Date of Patent: Jan. 14, 2014

(54) PROGRAM GUIDE USER INTERFACE

(75) Inventors: Richard C. Gossweiler, III, Sunnyvale, CA (US); Mehran Sahami, Palo Alto, CA (US); Manish G. Patel, Mountain View, CA (US); John Blackburn, Newcastle, WA (US); David A. Brown, Mountain View, CA (US); Neha Gupta, San Jose, CA (US); Thomas H. Taylor, Redmond, WA (US)

(73) Assignee: Google Inc., Mountain View, CA (US)

( * ) Notice: Subject to any disclaimer, the term of this patent is extended or adjusted under 35 U.S.C. 154(b) by 823 days.

(21) Appl. No.: 11/742,183

(22) Filed: Apr. 30, 2007

(65) Prior Publication Data

US 2008/0270449 A1   Oct. 30, 2008

(51) Int. Cl.
*G06F 3/00*       (2006.01)
*G06F 13/00*      (2006.01)
*H04N 5/445*      (2011.01)

(52) U.S. Cl.
USPC ............................................. 725/52; 725/53

(58) Field of Classification Search
USPC ......................................................... 725/53
See application file for complete search history.

(56) References Cited

U.S. PATENT DOCUMENTS

| | | | |
|---|---|---|---|
| 4,963,995 A | 10/1990 | Lang | |
| 5,010,499 A | 4/1991 | Yee | |
| 5,121,476 A | 6/1992 | Yee | |
| 5,589,892 A | 12/1996 | Knee et al. | |
| 5,629,733 A * | 5/1997 | Youman et al. | 725/53 |
| 5,793,438 A | 8/1998 | Bedard | |
| 5,801,787 A * | 9/1998 | Schein et al. | 725/43 |
| 5,805,235 A | 9/1998 | Bedard | |
| 5,808,694 A | 9/1998 | Usui et al. | |
| 5,880,768 A * | 3/1999 | Lemmons et al. | 725/41 |
| 5,903,816 A | 5/1999 | Broadwin et al. | |
| 5,940,073 A | 8/1999 | Klosterman et al. | |
| 6,002,394 A | 12/1999 | Schein et al. | |
| 6,005,562 A | 12/1999 | Shiga et al. | |
| 6,005,565 A * | 12/1999 | Legall et al. | 715/721 |
| 6,014,184 A | 1/2000 | Knee et al. | |
| 6,014,502 A * | 1/2000 | Moraes | 709/219 |
| 6,144,958 A | 11/2000 | Ortega et al. | |
| 6,147,715 A * | 11/2000 | Yuen et al. | 348/565 |

(Continued)

FOREIGN PATENT DOCUMENTS

| | | |
|---|---|---|
| JP | H11-308539 | 11/1999 |
| JP | 2000-270295 | 9/2000 |
| JP | 2004-32624 | 1/2004 |
| KR | 10-2007-0027143 | 3/2007 |

OTHER PUBLICATIONS

International Preliminary Report on Patentability, International Application No. PCT/US2008/062075, dated Nov. 12, 2009 (6 pages).

(Continued)

*Primary Examiner* — Brian Pendleton
*Assistant Examiner* — Jonathan V Lewis
(74) *Attorney, Agent, or Firm* — Fish & Richardson P.C.

(57) ABSTRACT

A computer-implemented method includes receiving a search request related to media programming and generating a search. The result has a list of one or more collections of episodes responsive to the search request, and a schedule grid displaying a plurality of episodes on a plurality of different channels for a time period, including at least one program responsive to the search request.

21 Claims, 16 Drawing Sheets

(56) References Cited

U.S. PATENT DOCUMENTS

| | | | |
|---|---|---|---|
| 6,216,264 B1* | 4/2001 | Maze et al. | 725/53 |
| 6,233,389 B1 | 5/2001 | Barton et al. | |
| 6,263,501 B1 | 7/2001 | Schein et al. | |
| 6,268,849 B1* | 7/2001 | Boyer et al. | 725/40 |
| 6,373,528 B1 | 4/2002 | Bennington et al. | |
| 6,483,548 B1 | 11/2002 | Allport | |
| 6,493,878 B1 | 12/2002 | Kassatly | |
| 6,505,348 B1* | 1/2003 | Knowles et al. | 725/49 |
| 6,523,028 B1 | 2/2003 | DiDomizio et al. | |
| 6,640,337 B1 | 10/2003 | Lu | |
| 6,642,939 B1* | 11/2003 | Vallone et al. | 715/721 |
| 6,769,128 B1 | 7/2004 | Knee et al. | |
| 7,065,709 B2 | 6/2006 | Ellis et al. | |
| 7,228,556 B2* | 6/2007 | Beach et al. | 725/53 |
| 7,328,450 B2 | 2/2008 | Macrae et al. | |
| 7,493,015 B1 | 2/2009 | Van Stam et al. | |
| 7,606,925 B2* | 10/2009 | Sheldon | 709/231 |
| 7,627,882 B2 | 12/2009 | Finseth et al. | |
| 7,685,619 B1 | 3/2010 | Herz | |
| 7,734,680 B1 | 6/2010 | Kurapati et al. | |
| 7,773,860 B2* | 8/2010 | Wood et al. | 386/296 |
| 7,779,009 B2 | 8/2010 | Chowdhury et al. | |
| 2001/0001160 A1 | 5/2001 | Shoff et al. | |
| 2002/0057893 A1* | 5/2002 | Wood et al. | 386/46 |
| 2002/0083451 A1 | 6/2002 | Gill et al. | |
| 2002/0133819 A1* | 9/2002 | Jackson | 725/39 |
| 2002/0133821 A1 | 9/2002 | Shteyn | |
| 2003/0046698 A1* | 3/2003 | Kamen et al. | 725/53 |
| 2003/0070171 A1* | 4/2003 | Jeon et al. | 725/56 |
| 2003/0110503 A1* | 6/2003 | Perkes | 725/86 |
| 2003/0126600 A1 | 7/2003 | Heuvelman | |
| 2003/0163828 A1 | 8/2003 | Agnihotri et al. | |
| 2003/0198461 A1* | 10/2003 | Taylor et al. | 386/83 |
| 2003/0226147 A1* | 12/2003 | Richmond et al. | 725/51 |
| 2004/0073922 A1* | 4/2004 | True | 725/45 |
| 2004/0078816 A1* | 4/2004 | Johnson | 725/52 |
| 2004/0088328 A1* | 5/2004 | Cook et al. | 707/104.1 |
| 2004/0123318 A1* | 6/2004 | Lee et al. | 725/46 |
| 2004/0123319 A1* | 6/2004 | Kim | 725/53 |
| 2004/0194141 A1* | 9/2004 | Sanders | 725/53 |
| 2005/0055715 A1* | 3/2005 | Minnick et al. | 725/58 |
| 2005/0071875 A1* | 3/2005 | Kempisty | 725/56 |
| 2005/0102704 A1 | 5/2005 | Prokupets et al. | |
| 2005/0204388 A1* | 9/2005 | Knudson et al. | 725/58 |
| 2005/0240963 A1* | 10/2005 | Preisman et al. | 725/44 |
| 2005/0240968 A1 | 10/2005 | Knudson et al. | |
| 2006/0130093 A1* | 6/2006 | Feng et al. | 725/39 |
| 2006/0136383 A1 | 6/2006 | Golla | |
| 2006/0195447 A1* | 8/2006 | Chang | 707/6 |
| 2006/0230035 A1 | 10/2006 | Bailey et al. | |
| 2006/0280435 A1* | 12/2006 | Choi | 386/83 |
| 2007/0106693 A1* | 5/2007 | Houh et al. | 707/104.1 |
| 2007/0157249 A1* | 7/2007 | Cordray et al. | 725/58 |
| 2007/0214131 A1 | 9/2007 | Cucerzan et al. | |
| 2007/0214480 A1* | 9/2007 | Kamen | 725/53 |
| 2007/0220048 A1* | 9/2007 | Ott | 707/104.1 |
| 2007/0283392 A1 | 12/2007 | Tsusaka et al. | |
| 2008/0022310 A1* | 1/2008 | Poling et al. | 725/46 |
| 2008/0063381 A1* | 3/2008 | Conroy et al. | 386/124 |
| 2008/0155607 A1* | 6/2008 | Klappert | 725/58 |
| 2008/0270446 A1* | 10/2008 | Gossweiler et al. | 707/102 |
| 2008/0270449 A1 | 10/2008 | Gossweiler et al. | |
| 2008/0270886 A1 | 10/2008 | Gossweiler et al. | |
| 2008/0271078 A1 | 10/2008 | Gossweiler et al. | |
| 2008/0271080 A1 | 10/2008 | Gossweiler et al. | |
| 2009/0055385 A1 | 2/2009 | Jeon et al. | |
| 2010/0257561 A1* | 10/2010 | Maissel et al. | 725/41 |

OTHER PUBLICATIONS

International Preliminary Report on Patentability for PCT Application No. PCT/US2008/062075, mailed Nov. 12, 2009, 6 pages.
Al Zabir, Omar, "Build a Google I G like AJAX Start Page in 7 days using ASP.NET AJAX and .NET 3.0". codeproject.com [online]. [retrieved on May 21, 2010]. Retrieved from the Internet: <URL: http://www.codeproject.com/KB/ajax/MakingGoogleIG.aspx>, 31 pages.
International Search Report and Written Opinion for International Application No. PCT/US2008/062075, dated Oct. 21, 2008, 10 pages.
Sahami, M., et al., "A Web-based Kernel Function for Measuring the Similarity of Short Text Snippets", Proceeding of the 15th International Conference on World Wide Web (WWW 2006), May 23-26, 2006, Edinburgh, Scotland, pp. 377-386.
Berniker. "TV guide going online," *Broadcasting and Cable*, 1994, 124(24):49.
"Lost-Infos, Episodenfuhrer, TV—Termine, DVDs, Videos," 2006, available at http://web.archive.org/web/20060614023608/http://fernsehserien.de/index.php?serie=9296. [Retrieved on Jun. 7, 2012], pp. 1-3.
European Search Report in European Application No. 08747228.8, dated Aug. 24, 2012, 4 pages.
European Office Action in European Application No. 08747228.8, dated Sep. 5, 2012, 6 pages.
Response to Communication Pursuant to Article 94(3) EPC, dated Feb. 25, 2013 in European Application No. 08747228.8, 15 pages.
Gross, "Ajax Patterns and Best Practices: Explore Dynamic Web Applications that Combine Ajax and REST as a Single Solution," Chapter 4, APress, 2006, 8 pages.
Office Action in European Application No. 08747228.8, dated May 10, 2013, 7 pages.
Japanese Office Action in Japanese Application No. 2010-506613, mailed Sep. 3, 2013, 8 pages.

* cited by examiner

Results 1 - 10 of 123 for "lost" in the next two weeks

Lost
Wed 13 Mar 10:00pm HISTP 450  The Monkey Suit
Thu 14 Mar 10:00pm HISTP 450  Treehouse of Horror
Fri 15 Mar 10:00pm HISTP 450  The City of New York v ...
6 more »

Lost in Space
Tue 12 Mar 9:00am FOX 12  Monster Attacks Zach
Tue 19 Mar 9:00am FOX 12  Danger! Danger!
Tue 26 Mar 9:00am FOX 12  Mission Blast-Off
12 more »

Lost in the Annals of Time for the Very Long Titles of ...
Wed 13 Mar 8:00pm DISC 43  Where is Waldo?
Thu 14 Mar 8:00pm DISC 43  Finding Mr. GoodBar
Fri 15 Mar 8:00pm DISC 43  When Cities Collide
14 more »

Lost and Found
Sun 17 Mar 9:00pm KQED 9  Finding Gold

Goooooooooogle ▲ Next
1 2 3 4 5 6 7 8 9 10

FIG. 5B

Results 1 - 10 of 123 for "lost" in the next two weeks

Lost
Wed 13 Mar 10:00pm HISTP 450  The Monkey Suit
Thu 14 Mar 10:00pm HISTP 450  Treehouse of Horror
Fri 15 Mar 10:00pm HISTP 450  The City of New York v ...
6 more »

Lost in Space
Tue 12 Mar 9:00am FOX 12  Monster Attacks Zach
Tue 19 Mar 9:00am FOX 12  Danger! Danger!  [new]
[TV] Series/Action - 60 min. HDTV PG-13 new
The robot goes crazy and starts bending metal, calling
Will Robinson "Fry" and stealing money from Mr. Smith.
Add the entire series to My Shows    details »

Tue 26 Mar 9:00am FOX 12  Mission Blast-Off
12 more »

Lost in the Annals of Time for the Very Long Titles of ...
Wed 13 Mar 8:00pm DISC 43  Where is Waldo?
Thu 14 Mar 8:00pm DISC 43  Finding Mr. GoodBar
Fri 15 Mar 8:00pm DISC 43  When Cities Collide
14 more »

Goooooooooogle ▲ Next
1 2 3 4 5 6 7 8 9 10

PROGRAM GUIDE USER INTERFACE

TECHNICAL FIELD

This document discusses systems and methods for providing program guide information to a user of a display device.

BACKGROUND

The writer Clive Barnes once noted, "Television is the first truly democratic culture—the first culture available to everybody and entirely governed by what the people want. The most terrifying thing is what people do want." It may be true that some people seek out bad television, but often people watch bad television only because they cannot find good television. Indeed, the development of personal video recorders (and VCRs before that) has enabled people to better select the shows they watch, and to avoid watching whatever happens to be on at the moment. Thus, people will watch good television if they can find it.

Electronic program guides provide a common mechanism by which people can find television programming. These guides commonly display information about a number of programs in a grid of cells arranged by channel and time—much like their predecessor paper guides, such as those published in the old TV Guide magazines and in newspapers. The information, when displayed on a display device like a television, may be static, in that the information is simply displayed to a user on a particular channel, such as in a continuously scrolling grid of channels. The information may also be interactive, in that users can scroll through the grid themselves and can select a certain cell, to be switched to a program represented by the cell.

Improved interaction with program guides and an ability to better find and interact with programming information can greatly increase the ability of users to find and manage programming that best suits their needs. As a result, such users can have a better viewing experience and can also watch more of what they enjoy and less of sub-par programming.

SUMMARY

This document describes systems and methods that may be employed to assist users in finding media programming in which they may have an interest, and that can provide additional information about, or access to, that programming. Generally, the systems and methods permit, in certain implementations, for the combination of (1) directed search results of media programs, with a display of a list of search results, and (2) related discovery, using a program guide such as a familiar programming grid.

The search results can be used as a navigational tool to guide discovery in the grid. For example, a user may submit a query relating to certain media programs, and the system may return search results responsive to the query in a list or other similar format. The system may also generate a programming grid that shows one or more of the search results, such as in a grid showing channels and times surrounding the broadcast of the most relevant search result. The user can then select other results form the search result list, and have the grid readjust to show those results also. In addition, the user may choose to see more detailed information about a particular program or episode, and the system may show the user such information, including by gathering information from multiple different corpuses of information.

Such techniques may, in certain implementations, provide one or more advantages. For example, they may permit users to more readily find programming that interests them. In so doing, the systems may couple the power of advanced search engines like the Google search engine, to navigational tools like programming grids. In addition, these components can serve as launching points for even further exploration by a user, such as by the user learning more detailed information about a program that may then lead to additional discovery by the user. As a result, viewing of television can lead to learning for a user, and may also lead them to discover additional programming that interests them.

Such features can also benefit broadcasters and advertisers in certain implementations. Users should watch (or listen to) more programming if it is something they enjoy, which should in turn result in more advertising revenue for broadcasters from advertisers, and more purchases by consumers from advertisers. In addition, the techniques can be used to provide targeted advertising for users, such as by selecting advertisements that are associated with a search request and that tie into programming information shown in a grid (such as advertisements for shows that come on after, or immediately after, a top search result, and on the same or a different channel.)

In one implementation, a computer-implemented method is disclosed. The method includes receiving a search request related to media programming; and generating a search result. The search result has a list of one or more collections of episodes responsive to the search request, and a schedule grid displaying a plurality of episodes on a plurality of different channels for a time period, including at least one program responsive to the search request. The list may include a show title and a show time. In addition, the list may contain a subset of episodes responsive to the search request, and further comprising displaying a control whose selection causes the display of additional episodes responsive to the search request. The collections of episodes can be organized by one or more categories selected from a group consisting of channel, genre, and program.

In some aspects, the method may also include receiving a selection of an episode in the list scheduled outside the time period and automatically moving the schedule grid to display the program. The list of one or more collections of episodes and the schedule grid can be displayed next to each other. In addition, the method can also include receiving a selection of an episode in the list or grid and displaying program details associated with the selected episode. The program details can be displayed in a pop up box over the list or grid. The program details can be displayed in a display pane separate from a pane displaying the list and grid. The program details can be made up of results obtained from a plurality of information corpuses. The program details can include information about a plurality of actors in the selected episode.

In some aspects, the method can also include receiving a selection of one of the plurality of actors and generating a search result on the selected actor. The method may even further include generating a map of actor casting connections for one or more of the plurality of actors. In addition, the method can include generating controls for selecting a plurality of follow-up actions for the selected episode. And the plurality of follow-up actions can include one or more actions selected from he group consisting of e-mailing episode information, establishing a recording of the episode, and adding the episode to a personal or shared calendar.

In other aspects, the methods may further include receiving a selection commenting on a show and making the comment available to a network of users associated with an information provider. The one or more episodes responsive to the search request may also be displayed in the schedule grid in a format that contrasts with programs that are not responsive to the request. The plurality of different channels can include station identifications, and can include personalized channels.

In one aspect, the method can also include generating a time bar for display across a spatial dimension of the schedule grid, the time bar having a time dimension that does not match the time dimension of the schedule grid. Also, the method can include, before generating the search result, determining a head-end for a user and asking the user for head-end related information if a head-end cannot be determined.

In another implementation, a computer-implemented method is disclosed. The method includes receiving a search request related to media programming, obtaining a plurality of search results responsive to the search request, and information for a schedule grid around one or more of the search results, and generating mark-up code for establishing a first and second screen areas and simultaneously displaying a portion of the plurality of search results in the first screen area, and the schedule grid in the second screen area. The portion of the plurality of search results can be grouped into a plurality of categories, wherein each category includes one or more media episodes. Also, each category can include a category title and each of the one or more media programs can include a display of a show time and a related channel. The schedule grid can also be defined by a time axis and a channel axis. Moreover, the plurality of different channels may include a personalized channel.

In another aspect, the method further comprises generating mark-up code to display program details associated with a program in the first screen area and displaying the program details, in response to a selection of a program, within the plurality of search results by pushing the search results outward from each other. The method may also include generating mark-up code to display episode details associated with an episode in the second screen area over the grid, in response to a selection of the episode.

In yet another implementation, a computer-implemented system for generating media programming information is disclosed. The system includes an interface to receive requests for media programming content, a programming database storing information about schedules for a large plurality of media programs, and a page formatter programmed to generate code for displaying media-related search results in one or more groupings next to a programming guide grid. The system may also include a media streamer to provide streaming media content in response to selection of a program on the programming guide.

The details of one or more embodiments are set forth in the accompanying drawings and the description below. Other features, objects, and advantages will be apparent from the description and drawings, and from the claims.

DESCRIPTION OF DRAWINGS

FIG. 1 shows displays illustrating interactions provided by an example program guide system.

FIGS. 1A-1C show particular displays from FIG. 1.

FIGS. 5A-5D show example displays providing media search results and details for such results.

Like reference symbols in the various drawings indicate like elements.

DETAILED DESCRIPTION

Figure 1:
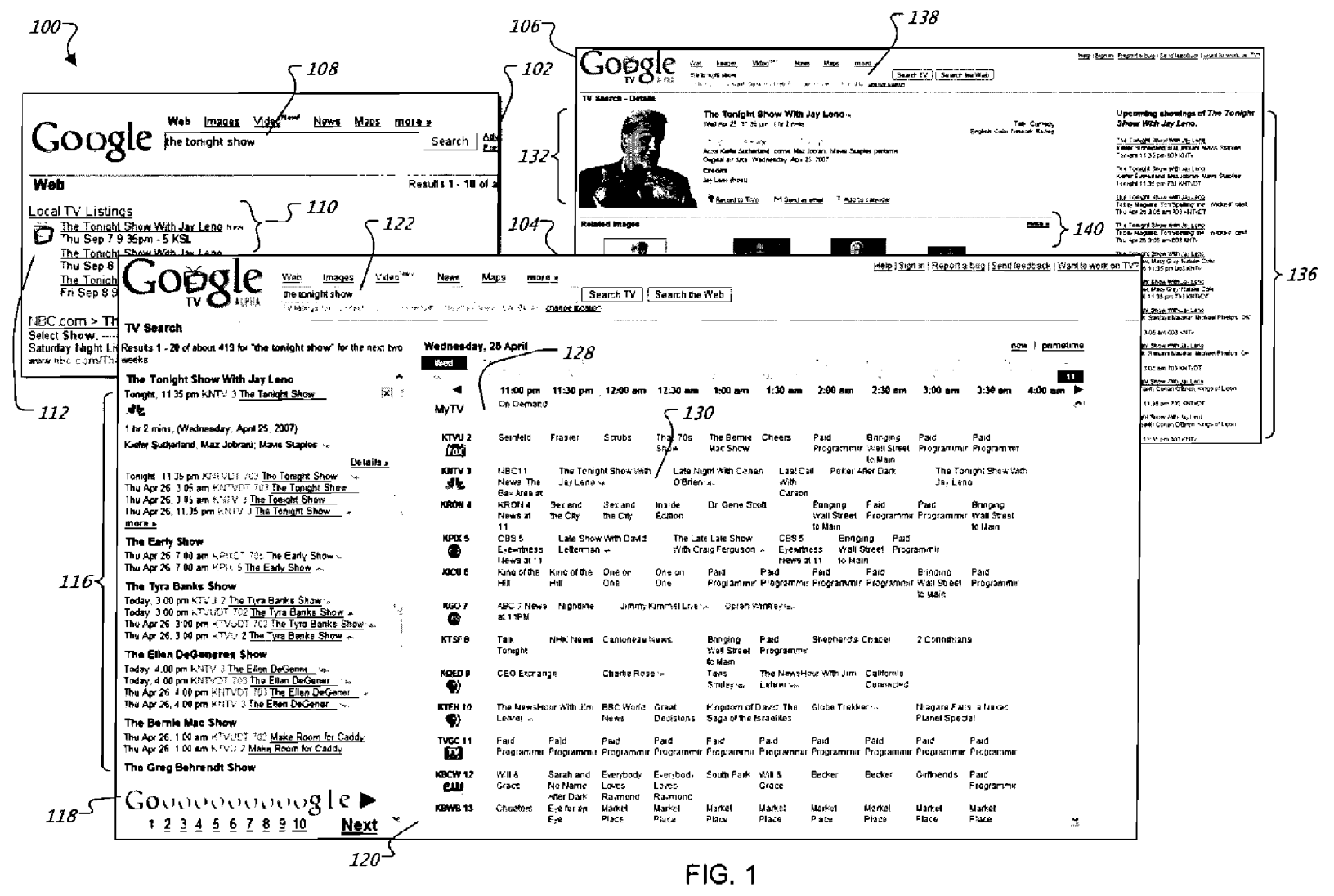
Figure 1A:
Figure 1B:
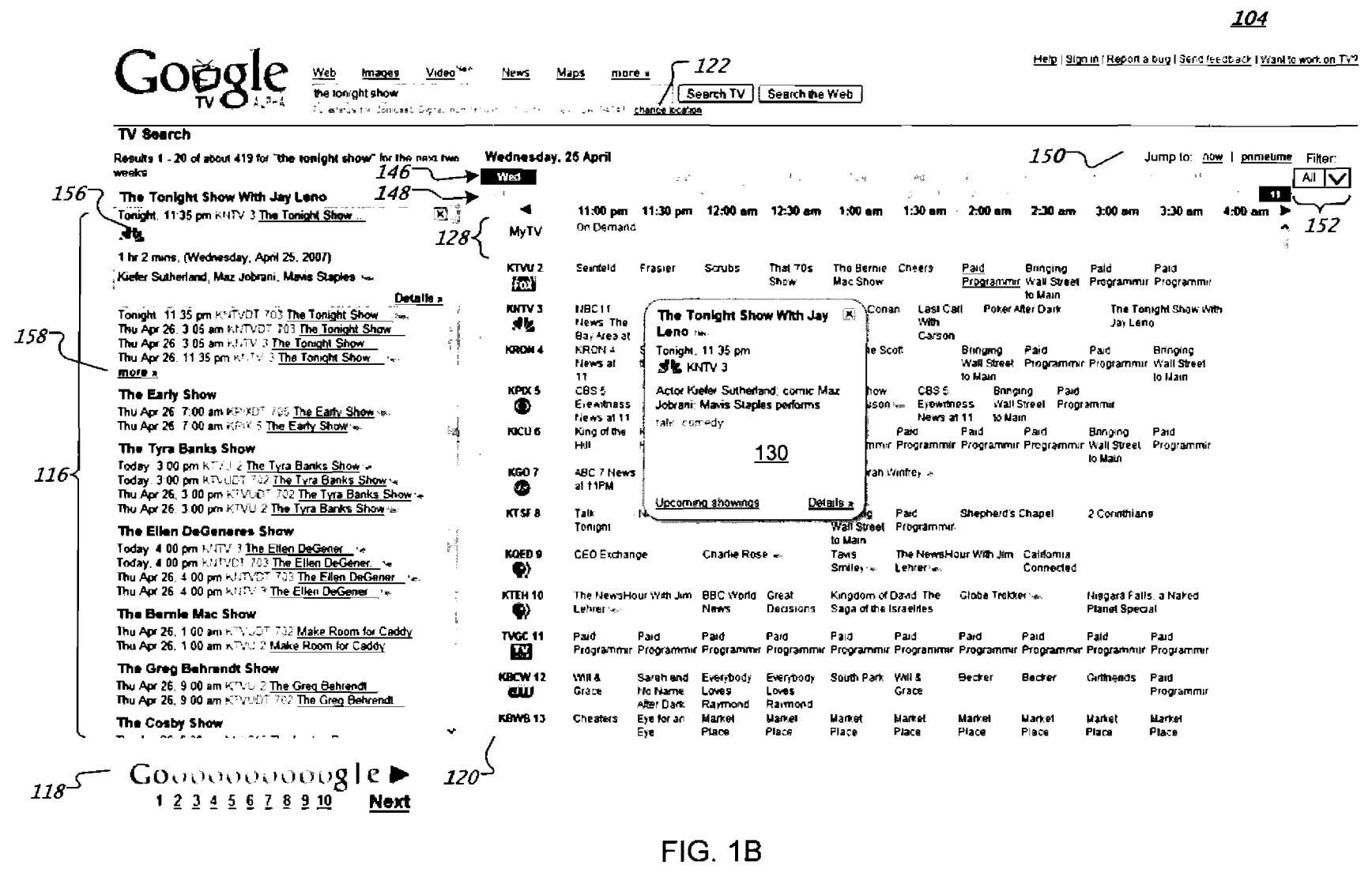
Figure 1C:
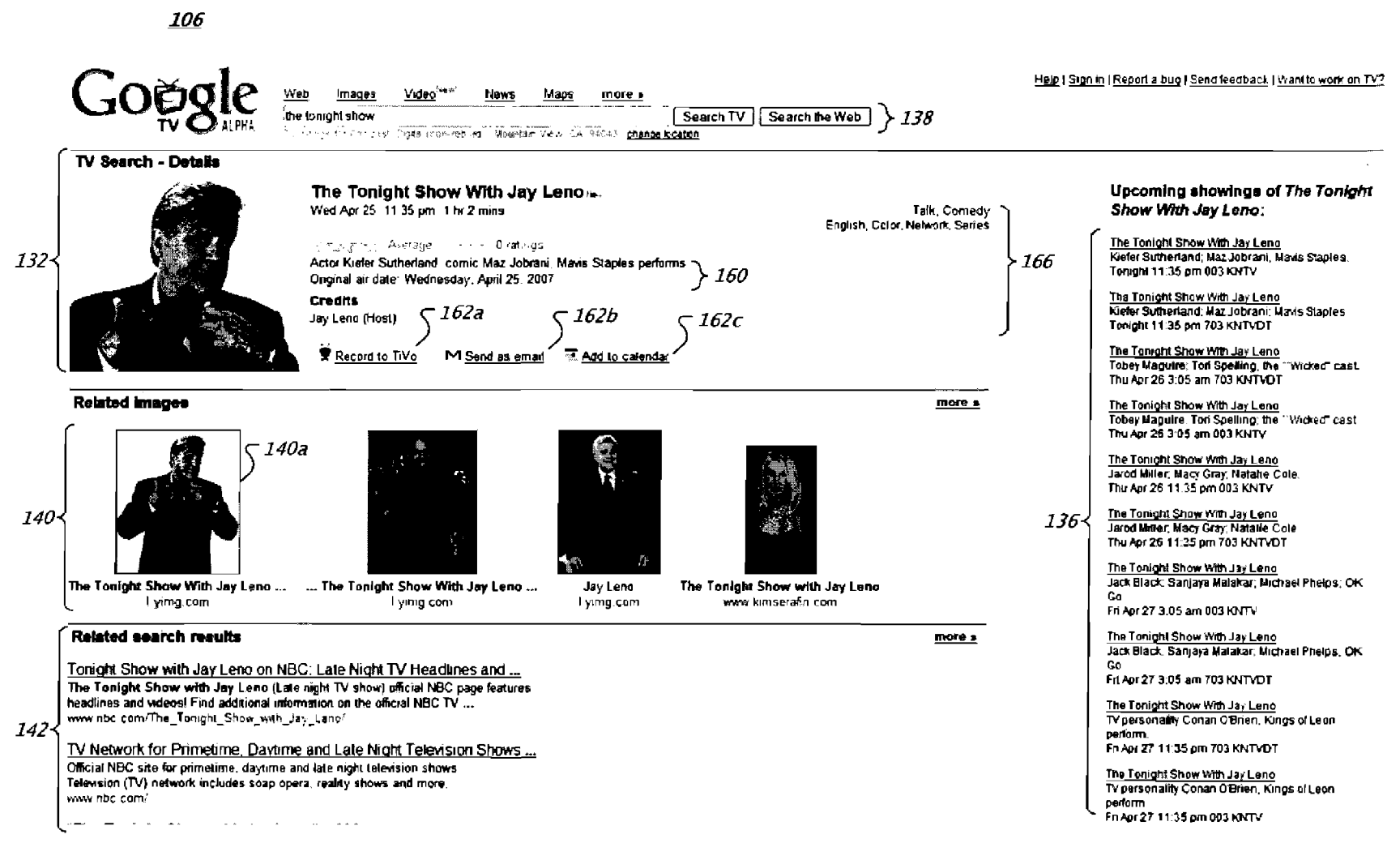

FIG. 1 shows displays illustrating interactions provided by an example program guide system 100, and FIGS. 1A, 1B, and 1C show particular displays from FIG. 1. In general, the program guide system 100 allows a user to search for media programming (e.g., broadcast television, cable television, satellite television, broadcast radio, satellite radio, and Internet media) by making a search request using a search page 102. The program guide system 100 presents, on the search page 102 and/or on a landing page 104, search results that are based on the search request.

The search results include a list of one or more collections of programs related to the search request—grouped by episodes of a program. An episode as used here can include a particular showing in a series of showings (such as an episode of a sitcom), or may include a single episode of a program (such as a movie or a discrete on-line video). The search results also include a program schedule grid 120 that displays a list of channels and program episodes presented by each of the channels for a particular time period. At least one of the program episodes in the schedule grid relates to the search request made by the user. In response to a user selection of a program in the schedule grid or the list, the program guide system 100 presents detailed information associated with the program in a details page 106.

In more detail, the search page 102 includes a search box 108 where a user may input a search term, such as a portion of a television program name. The search page 102 presents preliminary search results based on the search term input. The preliminary search results may include, for example, a list of web pages having information related to the search term. In addition, the preliminary search results may include a list 110 of media programming related to the search term. The media programming list 110 may include text, such as "Local TV Listings," that identifies items in the list 110 as media programming as apposed to web page items. The media programming list 110 also includes one or more media icons 112 that indicate the types of media programming presented in the list 110, e.g., a television, radio, or webcast icon.

Where the system is able to determine that a search request was likely media-related, it can group the media results in a manner that differs from an ordinary list of search results. Specifically, as shown, each of the listings on search page 102 is shown with a title, time, and channel, whereas standard search results may be shown with a title, snippet, and URL. This special formatting of a search result may be referred to as a "one box." Other search results, such as weather, location, and similar results may also be presented in a specially-formatted one box.

The program guide system 100 may present a landing page 104 in response to a user selection of an item in the list 110. The landing page 104 includes media result groupings 116. The groupings 116 list one or more collections of programs related to the search term. The groupings 116 group collections of programs, for example, by program name with each item in a grouping being a particular episode or airing of the program. Alternatively, the groupings 116 may be grouped using another parameter, such as grouping by the media channel presenting the programs, a genre of the programs, or the time of day the programs are presented. An additional results control 118 allows a user to navigate to other groupings that are not currently displayed, and that may be groupings considered to be less responsive to the user's request.

Each of the groupings 116 may also include a "more" control 158 that lists additional results within the particular grouping. In the pictured example, the three next-pending programs are shown for the media grouping associated with the television program "The Tonight Show", and a user can select the "more" control 158 to show addition programs further in the future. Such a selection may cause the Tonight Show grouping to expand and may also cause the other groupings to be removed to make room for the expanded grouping.

The groupings can also include an "Add to my TV" control that, when selected, can add a particular program (such as a series of episodes) or episode to a personalized program guide for the user. For example, a "My TV" channel may be maintained for a user, as described below, and an episode or all the episodes of a program may be added to that channel when the "Add to my TV" control is selected.

The landing page 104 also includes a schedule grid 120. The schedule grid 120 is displayed adjacent to and side-by-side with the groupings 116. The schedule grid 120 presents programming for a particular geographic location. A user may specify or change his or her location by selecting a change location control 122 and by making an input, such as a postal code (e.g., a ZIP code) or city and state names. The selected location may also be used to determine the programs presented in the list 110 and the groupings 116. Where the user is a user registered with the system 100, the user's default location may be used to generate programming suggestions.

The schedule grid 120 presents media programming for a particular time range on a particular date, such as over several hours. A user may select the date using a calendar control 146. The calendar control 146 may default to a particular date, such as the current date. When a search is performed, the grid 120 may default to the area surrounding the time and channel of the episode determined to be a best search result. Selection of other episodes in the groupings 116 may cause the grid to move automatically to display programs around the selected episode (or the first-returned episode for a particular grouping, if a grouping is selected).

The schedule grid 120 presents a list of media channels vertically along its left side and times of day horizontally along its top side in a time bar 148. The programs or episodes for a particular channel are presented in the channel's row and in a column having a time division closest to the actual time that the program is presented by its associated channel. The channels may be associated with a particular numerical channel for a broadcast, or may be a virtual channel such as a personalized channel or a stream of information over the internet.

The schedule grid 120 also includes a personalized channel 128, termed here as "My TV." The personalized channel 128 includes controls that allow a user to create a virtual channel using content from actual channels or another personalized channel, such as the personalized channel of another user.

Episodes or programs may be added to the personalized channel 128 in a variety of ways. For example, A user may select a program in the schedule grid 120, and may select a command to move it to the personalized channel 128 or may drag it to the personalized channel, among other things.

Also, one user may send a message to another user that identifies a particular program, such as by supplying a URL to a on line video, supplying an episode ID number, or through another accepted mechanism. In addition, the user may select a control such as the "Add to My TV" control, where that control is associated with a program or episode.

The schedule grid 120 includes the personalized channel 128. The personalized channel 128 is presented near the top of the grid 120 and slightly separated from the other channels to indicate that its programs are specified by the user rather than by a media provider broadcast. The personalized channel 128 can include multiple overlapping programs, and a user may be provided with various mechanisms with regard to watching and managing such programs. As one example, the programs may be displayed initially according to the times they are broadcast or are first made available for download. The user may then drag them later into time so that they do not overlap, so as to "program" a viewing schedule that the user may later follow.

Programs that are shifted in time from their actual broadcast time may be recorded when they are broadcast, such as by a PVR, and may be displayed according to the program the user has established. In this manner, a user can easily select programs to view, see whether the selected programs can be viewed when they are broadcast, and view the programs in a selected order as if they were live programs, but by time-shifting the programs in some selected manner. The personalized channel 128 is described in more detail with respect to FIGS. 4A and 4B below.

A selected program cell 130 may be used to initiate an operation related to the program in other ways also, such as navigating a user to a display that presents more detailed information regarding the program. The details page 106 presents such detailed information. The details page 106 includes a program details area 132. The program details area 132 presents detailed information regarding the program, such as a genre of the program, a runtime length of the program, names of performers in the program, a content rating of the program, a quality rating of the program, and a synopsis of the program.

The program details area 132 also includes an upcoming episodes area 136. The upcoming episodes area 136 presents a list of the upcoming episodes for the program. The list may include detail information such as an episode title, a time for the showing, and a channel on which the showing is to occur.

The details page 106 also includes a search control 138. The search control 138 allows a user to input a search term to initiate a search for a particular program. The search may be limited just to a corpus of information associated with programming, or may be performed on an entire web page corpus, depending on a selection from the user.

The details page 106 also includes an image details area 140. The image details area 140 presents images associated with the program, such as image result 140a. The image result 140a may be found by performing an Internet search for images related to the program, such as would be returned by the standard "Google Images" service. The search may be constrained in particular ways, such as by searching on a particular programming-related corpus of images or by adding certain terms, such as "television" to the query so that "Fred Thompson" returns images of the actor and not of other people. Details including a snippet, image details, and a URL that displays the image, are also provided in image details area 140.

The details page 106 also includes a search details area 142. The search details area 142 may present the results of a search for web pages related to the program, such as a search result 142*a*. The search details area 142 may simply be a proxy of results that would be shown in response to a standard search for the episode name when applied to a full corpus or a corpus limited to programming related information. Controls may also be provided so that the user can access more episodes, more image results, more search results.

In operation, a user may initiate the program guide system 100 either by inputting a search term, such as "The Tonight Show," for a general web search using the search control 108 or a media programming search using the search control 138. In the case of the search control 108, the program guide system 100 presents the list 110 of programs related to the search term "The Tonight Show" within the search page 102 as part of a one box. Selecting a program in the list 110 directs the user to the landing page 104.

Alternatively, a user may input the search term for "The Tonight Show" using the media programming search control 138, such as is displayed on the landing page 104 or the details page 106. The search input directs the user to the landing page 104.

At the landing page 104, a user may direct the schedule grid 120 to a particular channel, time, and date by selecting a program from the groupings 116. The groupings 116 are programs determined using the search term "The Tonight Show." Each program grouping includes one or more episodes of that particular program. The user may navigate to groupings not currently presented using the additional results control 118. Selecting a particular episode in a program grouping directs the schedule grid 120 to a particular channel, time, and date. The user may also navigate through the schedule grid 120 manually using controls, such as the calendar 146 and the time bar 148. In addition, the user may "drag" the control up, down, left, or right similar in manner to moving a map in Google Maps, and cells in the grid may be added from a queue to be displayed, and additional cells may be fetched or pre-fetched, in the manner of fetching tiles around a display in Google Maps.

Such fetching of tiles may occur by various mechanisms. For example, the system may simply pre-fetch tiles that surround the area currently being displayed (within a certain number of tiles). Also, the fetching may proceed to fill in all channels at a currently displayed time, and then fetching information in the future or in the last direction of time-wise travel in a grid (e.g., if a user's last move was to the right, then future tiles will be fetched). This technique operates under the assumption that people are more likely to surf through channels than to look into the past or future. Under a third technique, the pre-fetching may approximate the momentum of the movement of the grid—much like air over the surface of a moving wing. More material is pre-fetched in the direction of motion (where there can be three dimensions: time, channel, and level of detail). Where motion is particularly fast, more material is fetched in the directed of motion and less to the sides of the grid. As a user's motion slows, more data in other dimensions away from the motion may be pre-fetched.

Regarding a third grid dimension for detail level, such a dimension may be implemented in various manners. In one such implementation, at a least detailed level, a program title and little more may be shown in a grid so as to permit maximum density of tile display. At a more detailed level, a rating and a short description of an episode may be shown. At a yet more detailed level, more detailed description may be shown, and an image may be shown. At a more detailed level, information duplicating or approaching that shown for the detail page 106 may be shown.

The user may navigate to the details page 106 for a particular program by selecting (e.g., clicking or double-clicking on) the program in the schedule grid 120, such as the selected program cell 130. At the details page 106, a user may view detailed information regarding the program in the program details area 132. The detailed information may be obtained, for example, from a structured database that organizes media content according to programs, actors, and other similar parameters and links the information in a relational manner.

The user may view images related to the program in the image details area 140. The images may be obtained from a structure database, such as a database associated with the detailed information, or may be obtained from disparate sources such as in the manner of Google Image Search. The user may navigate to an image by selecting an image result, such as the image result 140*a*.

The user may navigate to a web page related to the program by selecting a search result, such as the search result 142*a*, in the search details area 142. The user may also select an image in image details area 140 to have the image associated with the program. For example, the selected image may then be displayed in the details area 132 in place of the prior image, or a portion that is cut out of the image may be displayed in the grid 120, such as in cell 130, so that a user can make particular favorite programs more visible in the grid in a manner that the user can visually associate the cell 130 with the program (e.g., by selecting a logo or title associated with the program).

FIGS. 1A-1C show particular displays from FIG. 1 in more detail. FIG. 1A shows the search page 102. The search page 102 allows a user to search for web content using the search control 108. The program guide system 100 determines that the search term (e.g., "The Tonight Show") may be a media program. For example, if the search term matches a media program name (such as a term stored in a "white list" of media-related terms) or the search term is included in a media program name, then the program guide system 100 may generate and present the list 110 of media programs.

Alternatively, the search term may be another attribute of a media program, such as the program's channel, an actor in the program, or the program's format (e.g., drama or situation comedy). A user may also "force" a media search, such as by preceding a search term with a prefix such as "tv", "tv:", or "televisions" In addition to a name of a media program, the list 110 presents a time, date, and channel for the media program. The list 110 also indicates whether the particular presentation of the program is new or a repeat. The results in the list 110 may be ordered by relevance to the search term, whether the program presentation is new, and/or the date and time that the program is presented.

The media icon 112 indicates that the list 110 presents media programs. The media icon 112 visually distinguishes the list 110 from general web page search results, such as web page search result 113. The search result 113 is also related to the search term "The Tonight Show." The search result 113 includes a title that identifies the web page, a uniform resource locator (URL) to navigate to the web page, a link to a cached copy of the web page, a link to web pages similar to the web page, and a link to note the web page, such as in a personalized web notebook like Google Notebook. Noting the web page stores information about the web page in a web notebook associated with the user.

FIG. 1B shows the landing page 104 including the media result groupings 116 and the schedule grid 120. The groupings 116 present a list of episodes, grouped by program, matching a particular search term. The matching programs are selected from channels that are available to the user, such as from local broadcast or other media providers. A particular head-end associated with the user may also be associated with the displayed programs.

The location and media providers accessible by the user may be selected using the change location control 122. The change location control 122 will be described in more detail with respect to FIGS. 2A and 2B.

The schedule grid 120 presents the programs matching the search term as well as other programs occurring around the time of the matching program. Selecting a particular instance of a program (e.g., an episode or broadcast) in the media result groupings 116 moves the schedule grid 120 up or down to a channel associated with the program, and left or right to a time associated with the program. This presents the program instance in the schedule grid 120. The schedule grid 120 may immediately present the selected program positioned properly in the grid or may gradually present the program, such as by slowly scrolling to the grid location of the program.

In certain implementations, a user may select a program instance or episode in the schedule grid 120 to generate a new list of programs in the media result groupings 116 related to the selected schedule grid program. In such a situation, the selected program name or another program attribute may be submitted as a programming-directed search request to the system in generating a new landing page 104. For example, if a user selects the cell for "South Park," the grid 120 may re-center on that cell, and the groupings 116 may include programs such as "Beavis & Butthead," (another animated comedy), "The West Wing" (because of the directional reference), and other similar programs.

Programs in the schedule grid 120 that also appear in the groupings 116 are highlighted to indicate that they match the search criteria that generated the groupings 116. The highlighting may be, for example, a shading, color, grid cell size, or cell border thickness that differentiates the schedule grid programs satisfying the search condition from schedule grid programs that do not satisfy the search condition. In certain implementations, the shading, coloring, or sizing varies based on, for example, the closeness of the match between the search term and the program. The shading, coloring, or sizing may also vary with the degree of separation between programs matching the search term and programs related to the matching programs. One manner in which such closeness or separation may be shown is by relative colors of the cells in a grid, similar to the display of a thermal map, with colors ranging steadily from blue (farthest) to red (closest), or another appropriate color scheme.

For example, a user may input a search term such as "Star Trek II: The Wrath of Kahn." Instances or episodes of the movie "Star Trek II: The Wrath of Kahn" in the schedule grid 120 may be highlighted with a first highlighting that is more significant than subsequent highlighting (e.g., a bright color (red for close hits moving to blue for farther hits), dark shading, or large sizing). Instances of Star Trek movies other than "Star Trek II: The Wrath of Kahn" in the schedule grid 120, such as "Star Trek: The Motion Picture," "Star Trek ill: The Search for Spock." "Star Trek IV: The Voyage Home," "Star Trek V: The Final Frontier," "Star Trek VI: The Undiscovered Country," "Star Trek; Generations," "Star Trek: First Contact," "Star Trek: Insurrection," and "Star Trek: Nemesis," may be highlighted with a second highlighting that is less significant than the first highlighting. The second highlighting indicates that the associated programs may not match the search term, but they are related to the programs that match the search term (e.g., they are other Star Trek movies).

In addition, episodes of Star Trek series programs, such as "Star Trek: The Original Series," "Star Trek: The Animated Series," "Star Trek: The Next Generation," "Star Trek: Deep Space Nine," "Star Trek: Voyager," and "Star Trek: Enterprise," in the schedule grid 120 may be highlighted using a third highlighting that is less significant than the second highlighting. The third highlighting (e.g., no highlighting at all) indicates that the Star Trek series programs may not match the search term and may not be the same type of media as the programs matching the search term (e.g., movies), but they are related to the programs through the Star Trek genre.

In another example, a user may input a search term for media programs having a particular actor or performer, such as "Leonard Nimoy." Media programs in the schedule grid that include the actor "Leonard Nimoy," such as "Star Trek: The Original Series," are highlighted with a first highlighting. Media programs having actors that have at some time performed with "Leonard Nimoy" are highlighted using a second highlighting. For example, episodes of "T.J. Hooker" and "Boston Legal" may be highlighted using the second highlighting as they include the actor William Shatner who starred with Leonard Nimoy in "Star Trek: The Original Series." However, episodes of "T.J. Hooker" in which Leonard Nimoy guest starred or directed may be highlighted using the first highlighting. The highlighting may also occur by placing images in the cells, so that programs involving Nimoy include a partial photographic portrait of Nimoy, and programs involving Shatner include a partial photographic portrait of Shatner.

In addition to highlighting programs matching the search terms in the schedule grid 120, the groupings 116 may also highlight the programs. The highlighting used in the groupings 116 may match the highlighting used in the schedule grid 120 for corresponding media programs. The groupings 116 may also present the media programs that are related to the media programs matching the search term.

The overall groupings 116 themselves may also be highlighted, such as by including an image associated with each grouping as a watermark behind the grouping. Such an additional feature (not shown) may add decorative interest to the search results, and may also provide additional information to a user. For example, a user may have no idea what the text "Square Pegs" means (e.g., as presented in response to a search for "Freaks and Geeks" or "Square One"), but when shown a background photo that includes Jami Gertz, Tracy Nelson, and Sarah Jessica Parker, they may instantly recognize the iconic Emmy-nominated 1982 program about Weemawee high school.

The schedule grid 120 has an associated calendar control 146. The calendar control 146 includes tabs that allow a user to select a particular date or day of the week. Each tab includes hours of the day associated with the tab. Selecting a time interval in the tab directs the schedule grid 120 to present programs for the selected day and time interval. The calendar control will be described in more detail with respect to FIG. 3.

The schedule grid 120 has a time bar 148 that indicates the times of day that programs in the schedule grid 120 are presented. The time bar 148 includes controls that allow a user to move to an earlier or later time or date. Alternatively, a user may move the schedule grid 120 by another method, such as by clicking on the grid 120 and dragging the grid 120 to a new time or date. The clicking and dragging may also move the grid 120 to present other channels. Alternatively, a user may use a control, such as a scroll bar, to move through the list of channels in the grid 120. As a user moves through times, dates, and channels in the grid 120, the landing page 104 may download data for channels and times/dates outside the periphery of the grid 120. This allows the grid 120 to present the programs for the channels and times that appear as a user moves the grid 120, without having to pause to download them.

The schedule grid 120 has an associated jump control 150 and an associated filter control 152. The jump control 150 allows a user to quickly move to the current time and date in the grid 120 or to a primetime (e.g., 8:00 PM) for the current day. The filter control 152 can be used to filter out various parts of the grid. For example, the filter may be used to show only prime time or late night programming, so that, for example, the grid jumps from 11:00 PM directly to 8:00 PM the next day. Likewise, the filter can be used to show only channels in a particular category, such as only movies channels or sports channels, or channels specifically selected by a user as their "favorites" channels.

The media results groupings 116 provide a compact area to view the results of the media programming search. Particularly, each grouping may present a number of programs that is less than the total number of programs in the grouping. For example, each grouping may represent a media program series and may present up to three episodes from the series. A program identifier 154 identifies the name of the series or grouping. The episodes or instances of the program are represented by schedule entries 156. A "more" control 158 indicates when more episodes or program instances exist that are not shown in the schedule entries 156. The "more" control 158 also indicates how many more entries exist. A user may select the "more" control 158 to present the additional entries. In addition, a user may select the "additional results" control 118 to present additional groupings. The "additional results" control 118 indicates the number of additional pages of media results groupings. A user may select a particular page of media results groupings to be presented in the groupings 116.

When the landing page 104 is resized, for example as a result of a user input, the schedule grid 120 may be resized accordingly. The addition or subtraction of page space may be divided among the cells of the grid 120. The cells of the grid may have minimum and maximum sizes, such that if the minimum or maximum sizes of the cells are reached rows and/or columns may be removed or added, respectively, from the grid 120. The resizing, addition, and subtraction of cells in the grid 120 may be performed by a client-side script in a web browser, such as JavaScript.

Alternatively, or in addition (such as after the cells have reached a minimum size) the cells may be maintained in constant size and the grid 120 may have its channel and time dimensions shrunk or expanded as the window is decreased or increased in size respectively. Thus, for example, as the window is decreased in size, programs may be cut off from the grid in half-hour increments and channel-by-channel with the cell size maintained. In this manner, navigation of the grid 120 may occur in the same way (e.g., dragging of grid cells) even when the window is shrunk, and there need not be a need for scroll bars in the navigation.

FIG. 1B shows an additional details box 130 that is not shown in the corresponding display in FIG. 1. The details box may be generated, for example, when a user hovers a mouse pointer over a particular cell for a sufficient period of time. The details box may show additional information as provided in the figure, and may also include controls whose selection causes a list of upcoming showings of the program to be displayed, or causes a details page to be displayed.

FIG. 1C shows the details page 106. As previously described, the details page 106 includes the program details area 132, the image details area 140, and the search details area 142. The program details area 132 shows a list 160 of actors associated with the presented program. A user may select an actor in the list 160 to initiate a search of media programming for the selected actor. The search may direct the user to the landing page 104. Alternatively, such a selection may obtain a details page associated with the actor, such as from the iMDB web site. Similar actions may be taken with respect to producers and others who might be associated with a program.

The program details area 132 includes actions 162a-c that may be performed using the program. The actions 162a-c are described in more detail with respect to FIGS. 6A-6D. The program details area 132 also includes information 166 associated with the program, such as an image from the program, the name of the series or program, the name of the episode, a synopsis of the episode, the date and time the program is scheduled for presentation, the channel presenting the program, the format of the program (e.g., a drama series), an indication of whether the program was previously presented or if it is a new episode, ratings information, and accessibility information. The information in the program details area 132 may be retrieved from web sites and services, such as a television/cable/satellite listings service and/or a movie/television information database.

The image details area 140 presents images and image information associated with the program. The images are retrieved by performing a search, for example, of the Internet, images previously retrieved form the internet, or another corpus, such as a structured collection of images, using the search term or other information associated with the program.

The search details area 142 presents web pages and web page information associated with the program. The web pages are retrieved by performing a search, for example, of the internet using the search term or other information associated with the program.

Figure 1D:
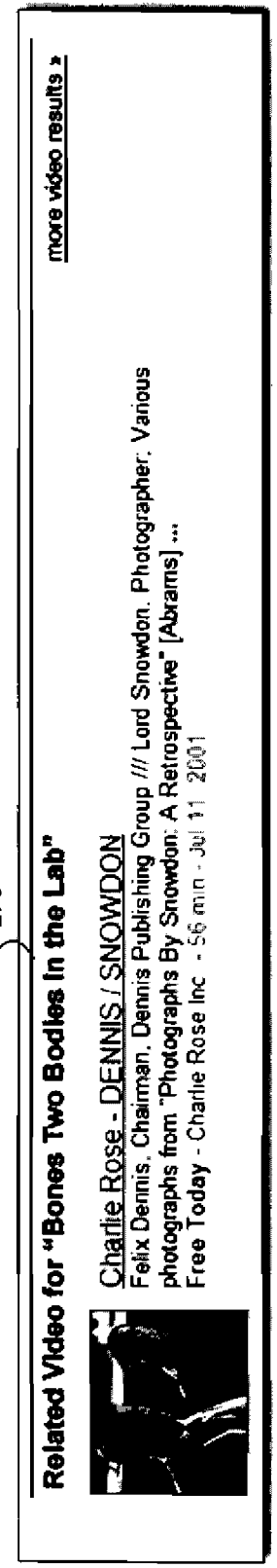
FIG. 1D shows an example display of a details area for video results.

In addition, the details page 106 may include a video details area. FIG. 1D shows a video details area 170 that may be included in the details page 106 (but for a different program in this example). The video details area 170 may present a thumbnail image or sample frame or frames (e.g., a short clip) of the video and a link to where the video may be found. The video or videos associated with the program may be retrieved by performing a search, for example, of the internet using the search term or other information associated with the program, or a search of videos at a site such as YouTube. The videos may include videos of other episodes of the program, or may include publicly made videos about the program, among other things.

As one example, keywords may be associated with a program, either manually or by analysis of characteristics of the program and a transcript of the episode. Those keywords may be used to identify matching videos. For example, an episode of JAG may include extensive discussions of aircraft carrier jet landings (as determined from a closed caption script of the program), so that video details area 170 for that episode includes results of videos showing spectacular carrier landings.

A user may select one of the images 140a-d and be directed to a web page where the image may be found. In addition, the user may select one of the web page links 142a-c to be directed to the web page where a reference to the program was found. In certain implementations, the user may input a rating and/or comment for the program. Other users may then view the rating (or a composite rating from multiple users) and/or comment provided by the user. In certain implementations, a user may customize the types of information presented in the details page 106, such as images, web pages, videos, or other media.

Figure 2A:
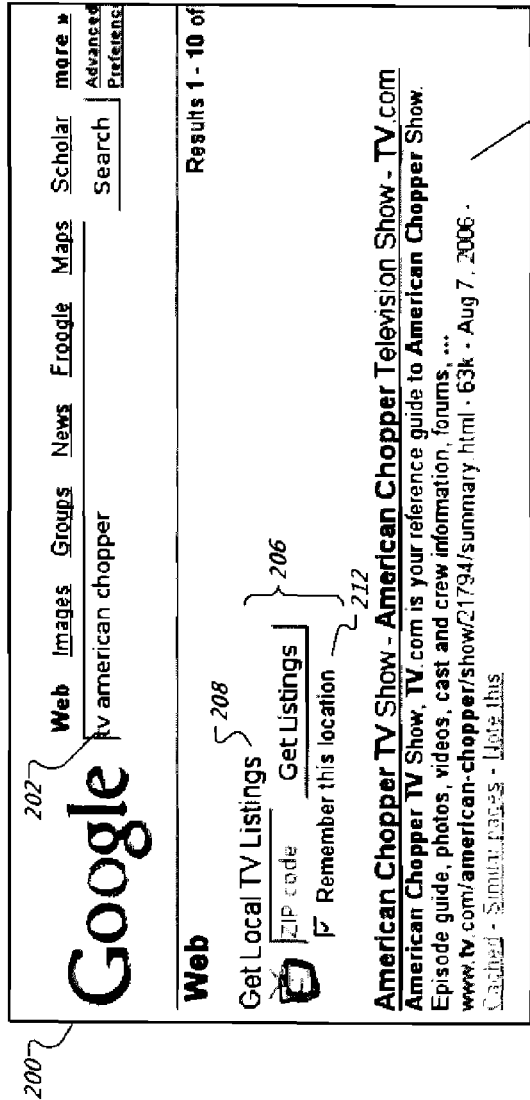
FIGS. 2A and 2B show displays for resolving a head end for a user of a program guide service.
Figure 2B:
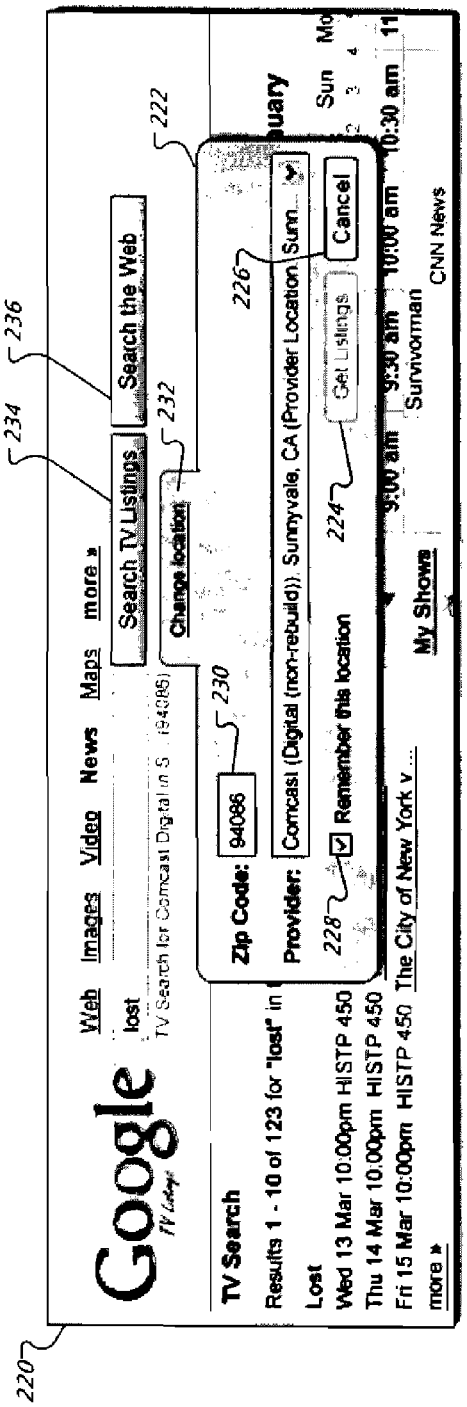

FIGS. 2A and 2B show displays 200 and 220, respectively, for resolving a head end for a user of a program guide service. The display 200 is a web search page. The display 200 includes a search control 202 where a user may input an Internet search term. The program guide service determines that the search term may be related to a media program. For example, the program guide service may recognize the search term as the name of a program or an episode of a program. Alternatively, the program guide service may recognize a keyword in the search term, such as "television," "TV,", or "movie," indicating that the search term may be related to media programming.

In addition to web page search results 204, the program guide service will present media programming information in a media program information area 206. However, in order to determine the media providers, or head ends, accessible to or used by the user, the program guide service may request additional information from the user. The display 200 includes a location identification control 208. In this example, a ZIP code or postal code is requested from the user using the location identification control 208. In another example, other location identification may be used, such as a country, region (e.g., state or province), and/or city. The user may select a "Get Listings" control 210 to retrieve media program information associated with the search term in the search control 202 and available in the location specified in the location identification control 208. The display 200 also includes a "remember this location" control 212. If selected, the user's location information may be stored, for example, in a database at a web server or in a cookie at a client device, and used in a subsequent media programming search.

Referring to FIG. 2B, the display 220 is a portion of a media program search landing page. The display 220 includes a change location display 222. The change location display 222 allows a user to change the location used to determine media providers or head ends available to the user. Such a display 220 may be shown after a user has identified a head end, but then chooses to correct or otherwise update their head end—such as if they determine that the programs shown in their program guide do not match the programs they are seeing on their display device."

The user may complete the update to the location by selecting a "Get Listings" control 224 or cancel the update by selecting a "Cancel" control 226. Again, the location information may be saved for subsequent media programming searches by selecting a "Remember this location" control 228. Here, a location identification control 230 includes a ZIP code and also a provider associated with the specified ZIP code. The user may select a specific media provider that provides media programs to the user, using a drop down selection. The selected media provider is used to determine the channels or head end to present to the user. The user may initiate the change location display 222 by selecting a change location control 232. The user may initiate a search for media programming using a search term by the selecting a media search control 234. Alternatively, the user may initiate a web search using the search term by selecting a web search control 236.

In certain implementations, a landing page may present groupings and a schedule grid containing channels from multiple media providers, for example, when a specific media provider is not known. The schedule grid may contain a control that allows the user to indicate when a particular channel is not available to the user. The program guide service may use the channel availability information to determine the media provider or providers available and/or utilized by the user. The service may then update information relating to a head for the user, such as by narrowing it to a single head end, and subsequent program guide presentations to the user may then be directed to the particular user.

Figure 3:
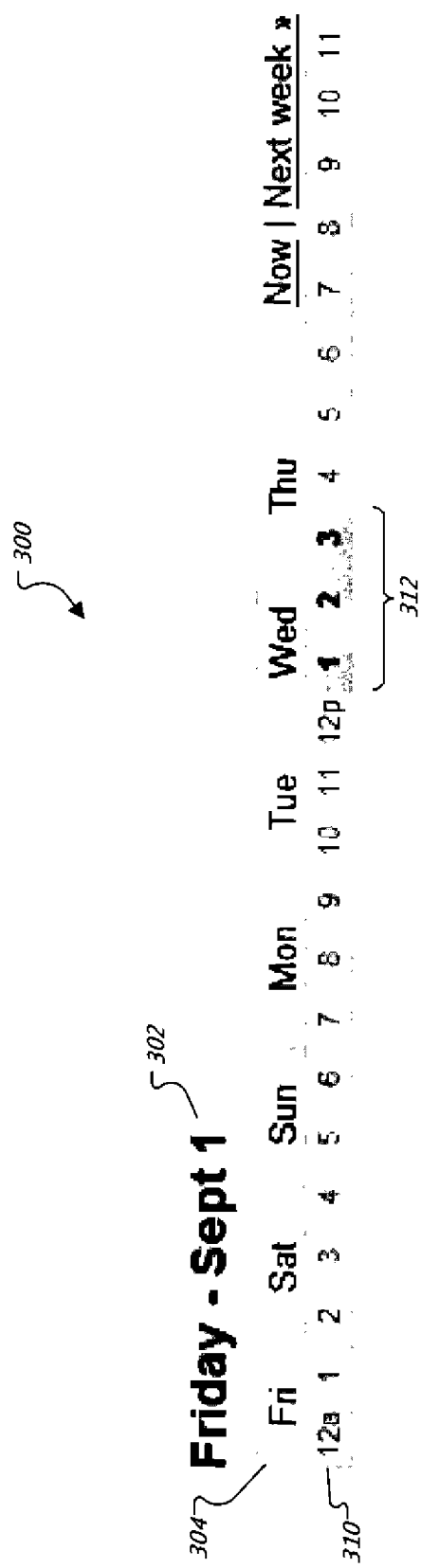
FIG. 3 shows an example of a schedule bar for use with a program schedule grid.

FIG. 3 shows an example of a schedule bar 300, or calendar bar, for use with a program schedule grid. The schedule bar 300 includes a currently selected date indictor 302. The date indictor 302 corresponds to a selected tab of a day selection control 304. The selection control 304 allows a user to select a particular day of the week or date to present in the schedule grid associated with the schedule bar 300. Generally, one or more weeks worth of days will be shown for selection by a user. Here, Friday has been selected, as indicated by the connection of the "Fri" tab to the lower row of the schedule bar 300.

The user may select a "Now" control 306 to move the schedule grid to the current date, and a "Next week" control 308 to move the schedule grid to the next week on the same day and time. The selected tab shows the hours of the day in a time control 310. The time control 310 contains a highlighted time span 312. The time span 312 indicates the range of times that are presented in the corresponding schedule grid (see FIG. 1B). The user may select a particular time in the time control 310 or select and drag the time span 312 to move the schedule grid to a new time.

Figure 4A:
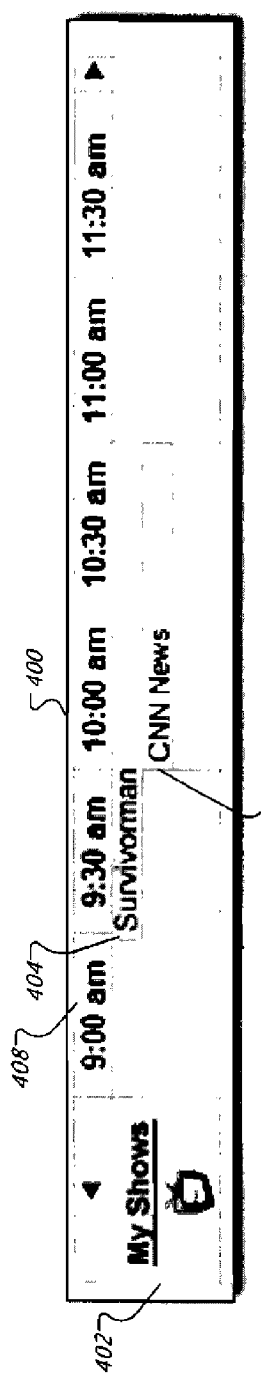
FIG. 4A shows an example display for a personalized media channel.

FIG. 4A shows an example display 400 for a personalized media channel 402. The particular displayed channel 402 includes two media programs 404 and 406. The programs 404 and 406 may be added to the channel 402, for example, by selecting and dragging the programs from a media result grouping or a schedule grid to the channel 402. Multiple episodes may be added to the channel when such a selection is made. When such programs are displayed with an overlap, the first program may be started and an alert may be issued to the user when the other program is set to start so that the user may switch to it or have it shifted backward in time until after the first program is over. The programs may also be treated as though they are on different channels for the purposes of viewing, such as channels "My.1," My.2," etc., much like various terrestrial high definition channels are currently handled. When a user switches away from one of the personalized channels, the program on the channel may be treated as if it continues to run (much like switching away from a program that is being broadcast in real time) or it may be pause and picked up when the user returns to the channel.

Programs in the groupings or the schedule grid may include controls, e.g., in the form of selectable buttons or context-sensitive menus raised by right-clicking on a cell, that add the programs to the channel 402. Other forms of media may be added to the channel 402, such as over-the-air broadcast radio, internet radio, web casts, or content from a digital music player. Where gaps in the programming occur during play time, the gaps may be filled with content such as music or advertisements, which may be downloaded from an internet-accessible source, and may be selected according to characteristics of the user and/or characteristics of the programming, or a combination of the two. For example, as described above, the dialogue in a program may be analyzed by using the closed caption text for the program. The ads may be targeted to such keywords associated with the user and/or the program.

In certain implementations, the user may control a home media player using the channel 402. For example, the user may build a list of video programs and audio interludes between the video programs to be presented using the home media player. Certain content, such as the interludes or bumper content (including advertisements), may be automatically suggested or inserted by the system. The selected programs may then be downloaded and/or recorded while being broadcast, and may be stored for later playing with the home media player. Where programming selected by a user overlaps in time, various mechanisms may be used to permit the user to watch all selected shows.

The display 400 includes a time indicator 408. In this example, the programs 404 and 406 are presented concurrently in their original channels. As will be described with respect to FIGS. 6A-6D, the user may perform actions using a program, such as recording the program with a digital video recorder. The user may then view the programs 404 and 406 at time of the user's choosing.

In certain implementations, a user may make all or a portion of the channel 402 available to another user. The other user may have the ability to view the programs in the channel 402. The other user may also have the ability to add or remove programs from the channel 402. For example, the user that created the channel 402 may give the other user specific permissions to the channel 402, such as read-only or read/write. In this manner, collaborative media sharing may occur with relative ease. In addition, when media to be played for a user is locally stored media rather than streaming media, a device for one user may transfer the media content to a device for the other user is appropriate circumstances, subject to digital rights management technology present in the systems, and using, for example, a peer-to-peer sharing arrangement.

Figure 4B:
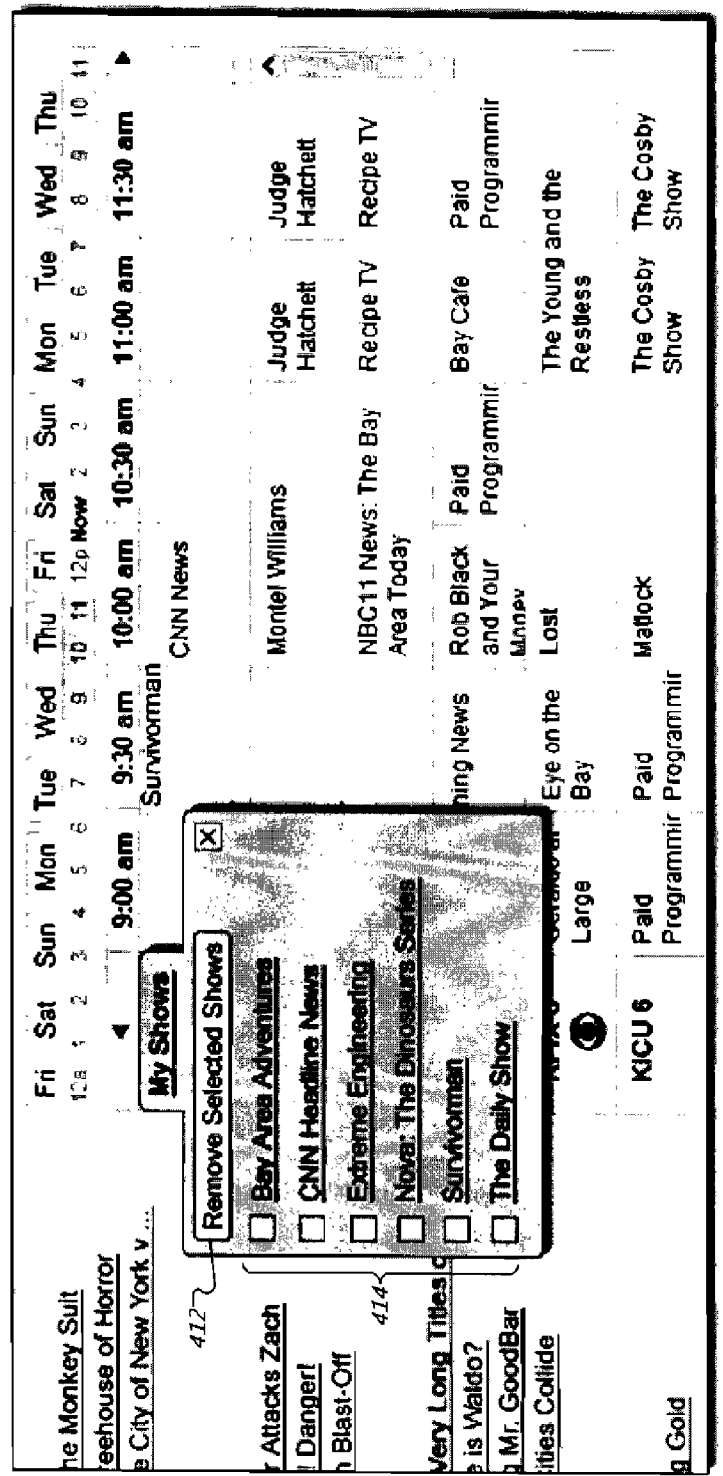
FIG. 4B shows an example mechanism for editing content on a personalized media channel.

FIG. 4B shows an example display 410 for editing content on a personalized media channel. The display 410 includes a "remove selected shows" control 412 and selection controls 414 corresponding to each of the programs in the personalized channel. A user may select one or more selection controls 414 by checking each show and may then select the remove selected shows control 412 to remove the selected programs from the personalized channel. Alternatively, the user may select a program in the personalized channel directly and drag it out of the personalized channel, or the program may have a pop-up menu that allows the program to be removed from the personalized channel (e.g., on right-clicking on a cell for the program).

Information may be assigned for display in display 410 by operation of controls in the landing page 104. For example, selecting "add to MyTV" next to a search result will add a series or an episode to the user's "My Shows" display 410. A similar display may show a list of episodes or programs stored on a user's PVR, or programs recommended by the user's acquaintances.

Figures 5C, 5D:
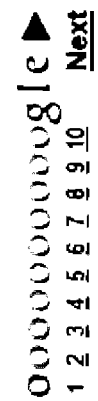

FIGS. 5A-5D show example displays providing media search results and details for such results. FIG. 5A shows a groupings area 500 of a landing page. The groupings area 500 includes groupings 502a-d that correspond to a media program search for the term "The Tonight Show." Each instance of a program (e.g., an episode) in the groupings (e.g., a series or program) includes a date/time 504 that the program is presented, a channel 506 presenting the program, and a name 508 of the program instance. The name 508 includes a link that moves an associated schedule grid to the program instance (or that opens a details display like those discussed above). Selecting the name 508 may also present more information about the program instance within the grouping 502d, such as by opening a details page or by opening a sub-window as shown in FIG. 5B. The groupings area 500 also includes an additional results control 510 as previously described.

FIG. 5B shows the groupings area 500 including a detailed information area 512. The area 512 is presented as a result of a user selecting the name of the program instance associated with the area 512. The area 512 presents additional information about the program instance, such as a format of the program, a length of the program, and a synopsis of the program instance. One or more groupings included in the area 500 may be removed when the area 512 is added to maintain the size of the area 500. Particularly, groupings may be removed to keep the additional results control 510 within view at the bottom of the area 500.

The area 512 includes an add control 514 that a user may select to add all occurrences of the program (e.g., all of the program episodes) to the user's personalized channel. The area 512 also includes a details link 516. A user may select the link 516 to navigate to a details page, such as the details page 106. The area 512 includes a close control 518. The user may select the close control 518 to close the detailed information area 512. One or more groupings may be added to the area 500 when the area 512 is closed, while maintaining the size of the area 500 as described above.

FIG. 5C shows the groupings area 500 including a groupings detailed information area 520. The area 520 is similar to area 512, but provides details on an entire series rather than on a particular instance or episode of that series. The area 520 includes information related to the program or series, such as a name of the series, a format of the series, and names of actors in the series. The area 520 is presented in response to a user selecting a name control 524 associated with the program. As with the area 512, the addition of the area 520 may result in one or more other groupings being removed from the area 500. The user may close the area 520 by selecting a close control 526. Again, one or more groupings may be added to the area 500 when the area 520 is closed. Alternatively, the areas 512 and 520 may be pop-up boxes displayed over the groupings area 500.

FIG. 5D shows a detailed information area 530. The area 530 is associated with a particular program in a schedule grid, and is similar to the details box shown in FIG. 1. The area 530 may be a pop-up box displayed over the schedule grid. Alternatively, a cell that includes the program may be expanded to present the additional information. The area 530 presents information related to the particular instance of the program or episode, such as a name of the episode, a date/time the episode is presented, a channel presenting the episode, and a synopsis of the episode. The area 530 may be initiated, for example, by selecting a program in the schedule grid. The area 530 includes controls to add the episode to a personalized channel, to search for other episodes in the program series, and to navigate to a details page (e.g., the details page 106). An image, such as a background image, associated with the program may also be shown in area 530 for decorative purposes and to help orient the user with respect to the program, as described above.

Figure 6A:
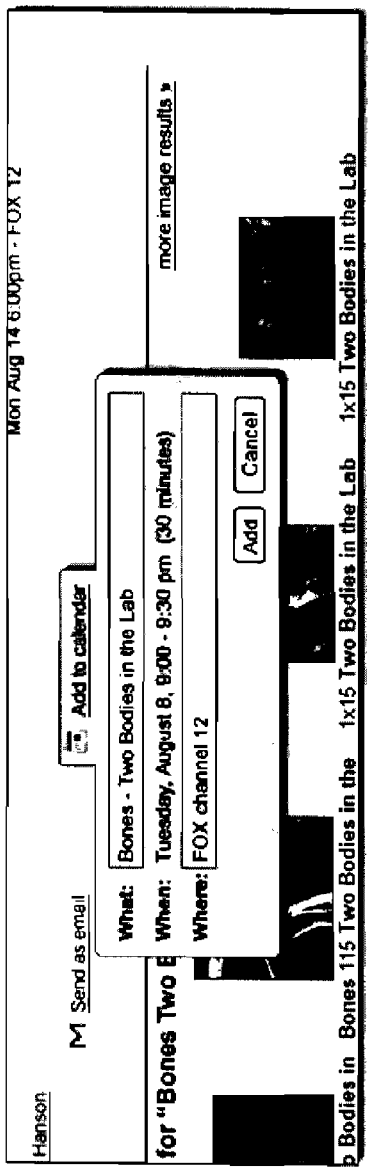
FIGS. 6A-6D show examples of actions that may be taken with respect to media programs.

FIGS. 6A-6D show examples of actions that may be taken with respect to media programs. FIG. 6A shows a display for adding an appointment or reminder to a calendaring application for a particular program. The add to calendar display may be a pop-up box presented over a details page, such as the details page 106. A user may initiate the add to calendar display by selecting the add to calendar control 162c (FIG. 1C). Such a selection may cause an appointment to be entered on the user's general calendar that lists information about the show in the traditional calendar fields, and a user may be allowed to change certain of the information in the fields, as shown by the data entry boxes in the figure. Although not shown, the user may also select an option to add the program to a calendar of an acquaintance, using actions like those used to establish a meeting through a scheduling program.

Figure 6B:
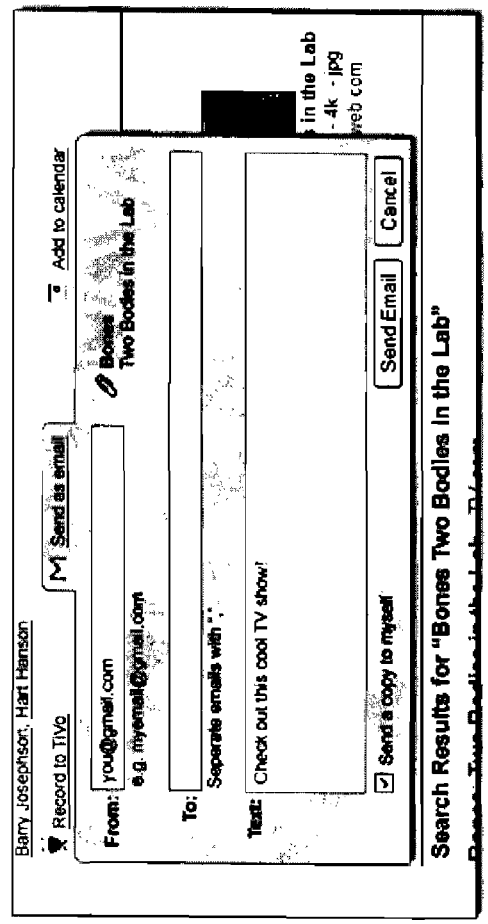

FIG. 6B shows a display for sending an e-mail regarding a particular program. The "send as e-mail" display may be a pop-up box presented over a details page, such as the details page 106. A user may initiate the "send as e-mail" display by selecting the "send as e-mail" control 162*b* (FIG. 1C). The "send as e-mail" display allows the user to input sender and recipient e-mail addresses. The user may also input a message body for the e-mail. Information regarding the program is sent as an attachment to the e-mail. Alternatively, the program information may be sent in the body of e-mail or the e-mail may include a link to a web page or other web content where the program information may be found and accessed.

Figures 6C, 6D:

FIG. 6C shows a display for specifying connection information for a recording device, such as a digital video recorder (DVR) or personal video recorder (PVR). The connection information display may be a pop-up box presented over a details page, such as the details page 106. The connection information display may be initiated, for example, when connection information has not been provided and the user selects the "record to DVR" control 162*a*. The connection information display allows the user to input connection information such as an address and a password for a DVR. In the example shown, the DVR is accessed using an e-mail address. The DVR may be a piece of hardware separate from a desktop computer, or may be a software program running on a desktop or similar computer, such as on a media center PC.

FIG. 6D shows a display for recording a particular program to a DVR. The "record to DVR" display may be a pop-up box presented over a details page, such as the details page 106. A user may initiate the "record to DVR" display by selecting the record to DVR control 162*a*. The "record to DVR" display allows the user to input DVR settings for the recording, such as a particular DVR to be used, a priority of the recording operation, and a quality of the recording. The "record to DVR" display also allows a user to send an e-mail confirmation regarding the recording. The particular parameters to be defined may differ depending on the DVR to which the programming is to be sent, so as to match an API or other restriction for the particular DVR.

Figure 7A:
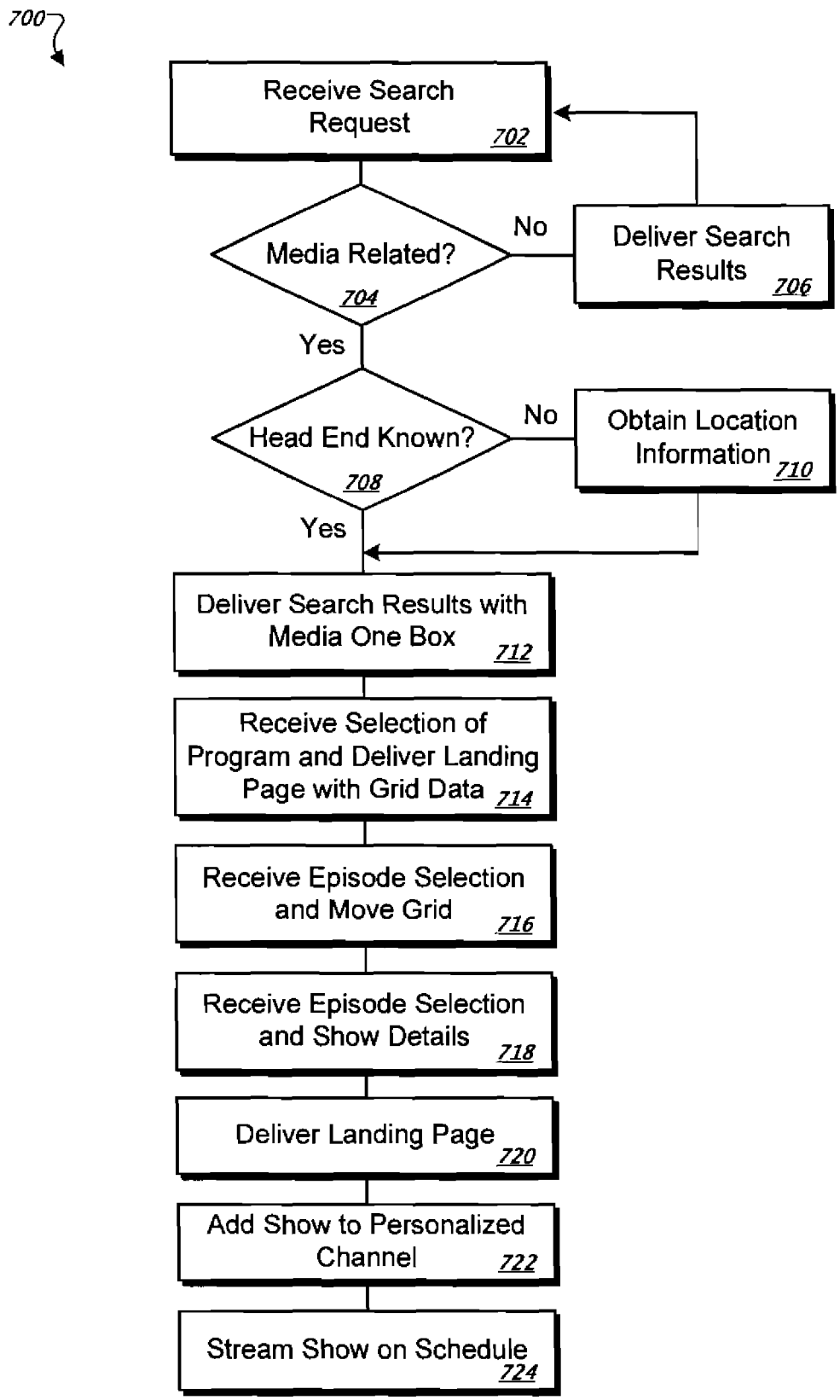
FIG. 7A is a flow chart showing actions performed by a system in providing a user with programming information.

FIG. 7A is a flow chart 700 showing actions performed by a system in providing a user with programming information. In general, the chart 700 shows server-side actions made in response to actions by a user at a client who is browsing media programming information, such as in the screen shots shown in FIGS. 1 and 1A to 1D.

At box 702, the system receives a search request, which may have been submitted through a search request box for a standard search engine. The system may first determine whether the request is media related (704), such as by comparing terms in the request with terms in a whitelist of media-related terms or concepts. Other similar determinations may be made on the request for similar purposes, e.g., for local search terms, weather-related terms, for shipping information (e.g., UPS and FedEx numbers), etc. If the request is not determined to be media related, basic search results may be delivered back to the user (box 706).

If the request is determined to be media-related, the system may then check to determine whether the user's head end is known, such as by using a cookie or otherwise looking in a system-side database entry associated with the user. If the head end for the user is not known, code for a display like that shown in FIG. 2A may be delivered to the client device of the user, and the user's head end can be determined by obtaining location information for the user (box 710).

Once head end information can be determined, the system may deliver search results to the user with a media one box, similar to the display in FIG. 1A. After reviewing the results, the user may select a displayed program from the one box, and the server may receive an indication of such a selection, and may generate code for a landing page like that shown in FIG. 1B. The code may include a list of search results organized in groupings or in some other manner, and code for generating an interactive grid, along with data for generating an initial display of the grid (e.g., around an episode for the top search result) (box 714).

Box 716 shows actions in response to a user's moving of the grid, such as by clicking on a cell and dragging it one way or another. Information about the display area for the grid may be provided to the system, such as by JavaScript running on the client, and a bounding box may be determined for cells displayed in the grid and those around the edge of the display. The relevant cell data may be retrieved and/or generated, and the system may provide additional data, such as in the form of XML data, to the client for filling in new cells (e.g., using tiles) in the grid.

Box 718 shows actions in response to a user's selection of a link for a particular episode. In such a situation, the system may deliver mark up code for a details page such as is shown in FIG. 1C. A user may make various selections while on the details page, as described above, and then may select to be returned to the landing page (box 720). Once back on the landing page, the user may select an episode of a show, such as by dragging a cell into the personalized channel bar, and the system (at the client, and also at the server in certain implementations) may add the episode (and perhaps other episodes of the same program) to the user's personalized channel (box 722).

The server side of the system may keep track of programs in a personalized channel so as to be able to provide programming to the user in a scheduled manner. The user's client device may likewise keep track of the schedule and call for the programming at the appropriate time. For example, when a client device is operating and a user selects a channel, such as a personalized channel, that is carrying programming for the current time, the client may make a request for the programming from the server. The server may stream the programming to the client device (box 724), and may be caused to change to different programming, such as if a user chooses to skip a program, or an overlap in programming occurs and another program has a higher priority for the user than does the currently playing program.

Figure 7B:
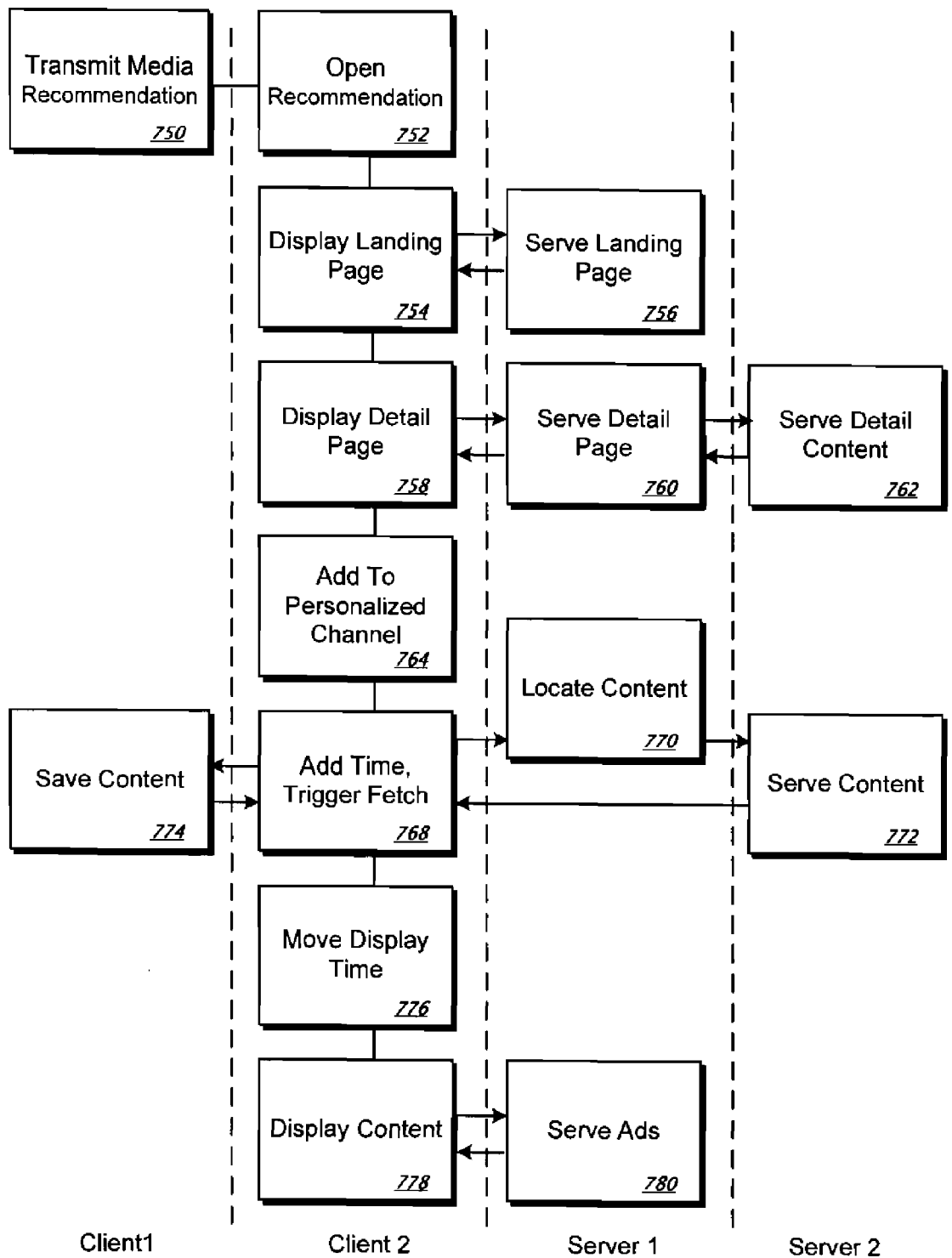
FIG. 7B is a swim lane diagram showing an example of interaction between a client and server for providing programming information.

FIG. 7B is a swim lane diagram showing an example of interaction between a client and server for providing programming information. In general, this diagram shows the actions taken by clients and a server or servers in an example scenario in which one user shares programming information with another user, and the other user then chooses to watch the content. Various other steps may be included, however, and the relationships of clients and servers may be altered in performing the process. The particular devices and steps shown are merely an example.

At box 750, a client device for a first user may transmit a media recommendation to a second user. The recommendation may occur in the form of an e-mail containing a link associated with the content, or may take another form, such as a recommendation submission to a central system with which both of the users are members. The transmission may also occur with a single user, such as when a user sends a recommendation from his or her desktop computer at home or work to a set-top device connected to a television.

The second client may then receive the recommendation (box 752) and the user may act on it, such as by opening an e-mail and then selecting a link in the e-mail or dragging the link to a personalized channel. Before the second user adds the program to a personalized channel, they may select various controls to see more information about the program. For example, at box 754, the user chooses to display a landing page like that shown in FIG. 1A, and the first server provides information for displaying the landing page. The user may thus see a programming grid with the relevant episode of a program at its center and may determine whether they are available to watch the program and whether there are other programs at the same time on their personalized channel.

The user may make a selection to see a detail page (box 758) if they want to learn more about the program, and the server may provide code for rendering such a page (box 760) and may get additional information to complete the page from one or more other servers (box 762). For example, information about actors and others in a program may be obtained from a third party aggregator of such information.

Once the user has determined they want to watch the program, they can add it to their own personalized channel (box 764). The program may be added for a particular display time, such as if the first user and the second user (and other additional users who may have received an indication about the program) want to watch the program at the same time and communicate about the program (such as in a chat room linked to the showing) as it runs. Alternatively, the program may be scheduled to run at a different time, such as immediately, or in a slot of regular viewing time (e.g., prime time) in which there are no scheduling conflicts for the user with other programs.

At a set time, such as during a time of low network usage sufficiently in advance of the time of showing, the second user's client may fetch the content. The time may be at the time of display where the content is to be shown as streaming content. The client device may, in appropriate circumstances, acquire the content from the first client device (box 774) or may acquire the content from or through the main system. For example, the client may request the content from the main system (boxes 768) and the server may deliver the content (box 770) and/or redirect the client to content on another server (box 772).

At box 776, after the content has been retrieved but before it has been reviewed, the user moves the program so that it is to be displayed at a different time. The location of the program in the user's personal channel may be updated in such a situation. The update may occur only on the client device when the content is downloaded before display, or may also be reflected at the server. In addition, when the display time for multiple users is linked, other users may be notified that a first user has moved the program, to determine whether they too would like to change the time at which they watch the program.

Finally, at box 778, the time to display the program has come and the client device plays the program for the user (if the device is turned on or logged in). The program may be played from local storage or may be streamed from the sever. In either situation, ads such as targeted ads (targeted, e.g., to key words associated with the program and with the user) may also be delivered from the server to the client (box 780). The ads may be inserted between programs, may be shown during breaks in a program, or may be shown simultaneously with a program, such as in a scrolling banner across a screen. Where the media is streamlining, the ads may b inserted at the server.

Figure 8:
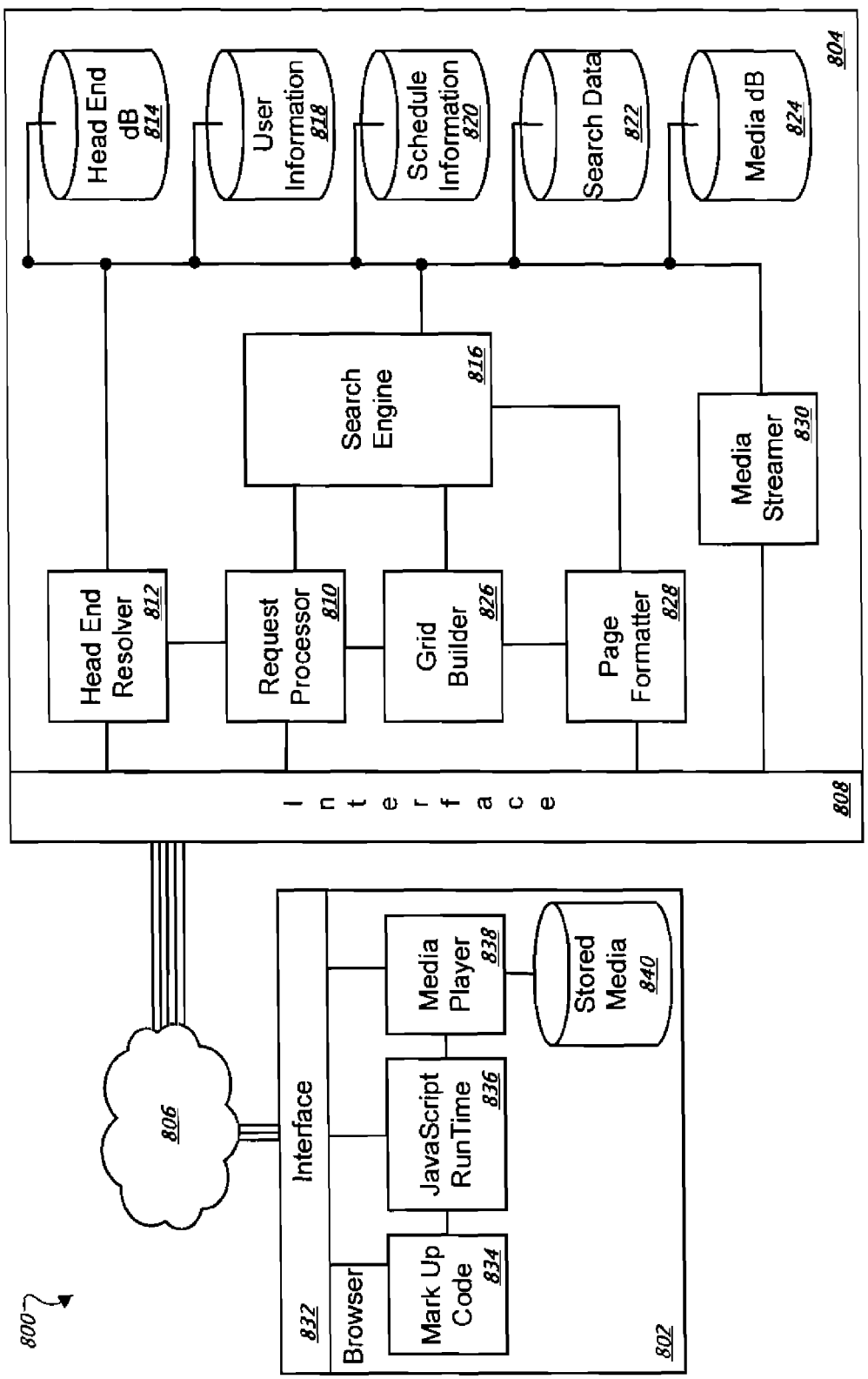
FIG. 8 is a schematic diagram of an example system for accessing media programming.

FIG. 8 is a schematic diagram of an example system 800 for accessing media programming. The system includes a client 802, a server 804, and a network 806, such as the internet, connecting the two. The server 804 may communicate through an interface 808, which may itself include or be part of one or more web servers. Media-related requests from the client may be identified by the interface and routed to the request processor 810. The request processor may parse the requests into their constituent parts to determine the sort of information requested by the client 802. For example, if the request is a media-related search request, the request processor may pass the search terms to search engine 816, which may return one or more search results in a conventional manner. Also, the search engine 816 may return a media one box, like those described above, where the request is determined to be media related.

Also, if a head end has not been associated with the client 802, a head end resolver 812 may be used to query the user for location information and other information (such as telecom provider) that may help in selecting a head end for the user with information stored in a head end database 814. A head end typically describes a particular source of programming for a user that is unique among various possible sources. Where a head end cannot be determined precisely but a reasonable number of head ends can be determined to be possible solutions, a generalized presentation covering all of the possible head ends may be provided. For example, for a particular row in a grid, a call sign (e.g., NBC, CBS, ABC, FOX, etc.) may be displayed, but without displaying a channel number (when that affiliate is displayed on different channels for different head ends) or by displaying both possible channel numbers (where two different providers might server the user from two different channels).

Where a user requests a landing page, grid builder 826 may provide code and generate data for display of a program grid at a particular date and time for a user. The grid builder 826 may receive signals, such as from search engine 816 regarding the position in the grid that is to be displayed on the client 802. Grid information and search information may be provided to a page formatter 828, which may generate code for the display of pages like those shown in FIGS. 1A-1D. The page formatter may also draw on other sources, such as image search results provided by search engine 816, and structured media data stored in media database 824. For example, relationships between and among actors and programs may be stored for display on a details page as shown above.

Various databases may also be accessed by system 800. For example, user information database 818 may contain personalized information about users. Such information may include, for example, favorite channels of the user, the content of the user's personalized channel and other information that may be used to generate custom displays like those shown in FIGS. 1A-D. The data may be accessed, for example, in response to requests from JavaScript running on the client, and may be supplied via XML or other format for use in an asynchronous fashion. Also, schedule information 820 may be provided, such as to grid builder 826, for display of programming information.

Media streamer 830 may be used where streaming media is provider by the system 800. The media streamer 830 may take any appropriate form and may be triggered based upon a display request from the client 802 when a particular program is set for display on the client 802.

Client 802 may communicate via interface 832. Interface 832 may include an interface for computer communications, such as an Ethernet interface connected to the network 806. Interface 832 may also include inputs for services such as OTA broadcast, cable, and/or satellite television reception. Various forms of broadcast media may be received through such mechanisms.

In the particular example, the client 802 interacts with a user through a web browser, though other applications may also be used to provide information to, and receive commands from, a user. Mark up code 834 on client 832 may be accessed by the browser and may cause displays like those shown and described above to be generated on the client 802. The mark up code may include XML and HTML, along with CSS for data formatting.

A JavaScript Runtime component 836 may also be provided and may permit for the operation of certain interactive features discussed above, such as movement of the program guide grid and fetching of grid tiles. The JavaScript runtime component 836 may execute code as part of an AJAX programming mechanism, to dynamically call the server 804 to obtain XML, HTML, and CSS information without having to leave or refresh a page such as the landing page 104.

Media player 838 may take various appropriate forms, and may include encoders and decoders for receiving, translating, saving, and playing audio/video content. Media player 838 may include, for example, components of Windows Media Player or other appropriate components, and may be control by selections by a user on the client, such as through a browser generating displays from mark up code 834. Media player 838 may render real time video and audio, and also lay out dynamic graphics such as Flash for real time embedded data (e.g., showing virtual baseball players on a diamond). Stored media 840 provides storage for programs, in a manner similar to that for standard personal video recorders. Media provided by media player 838 may be streamed over network 806, received from a broadcast source, or played from stored media 840.

Figure 9:
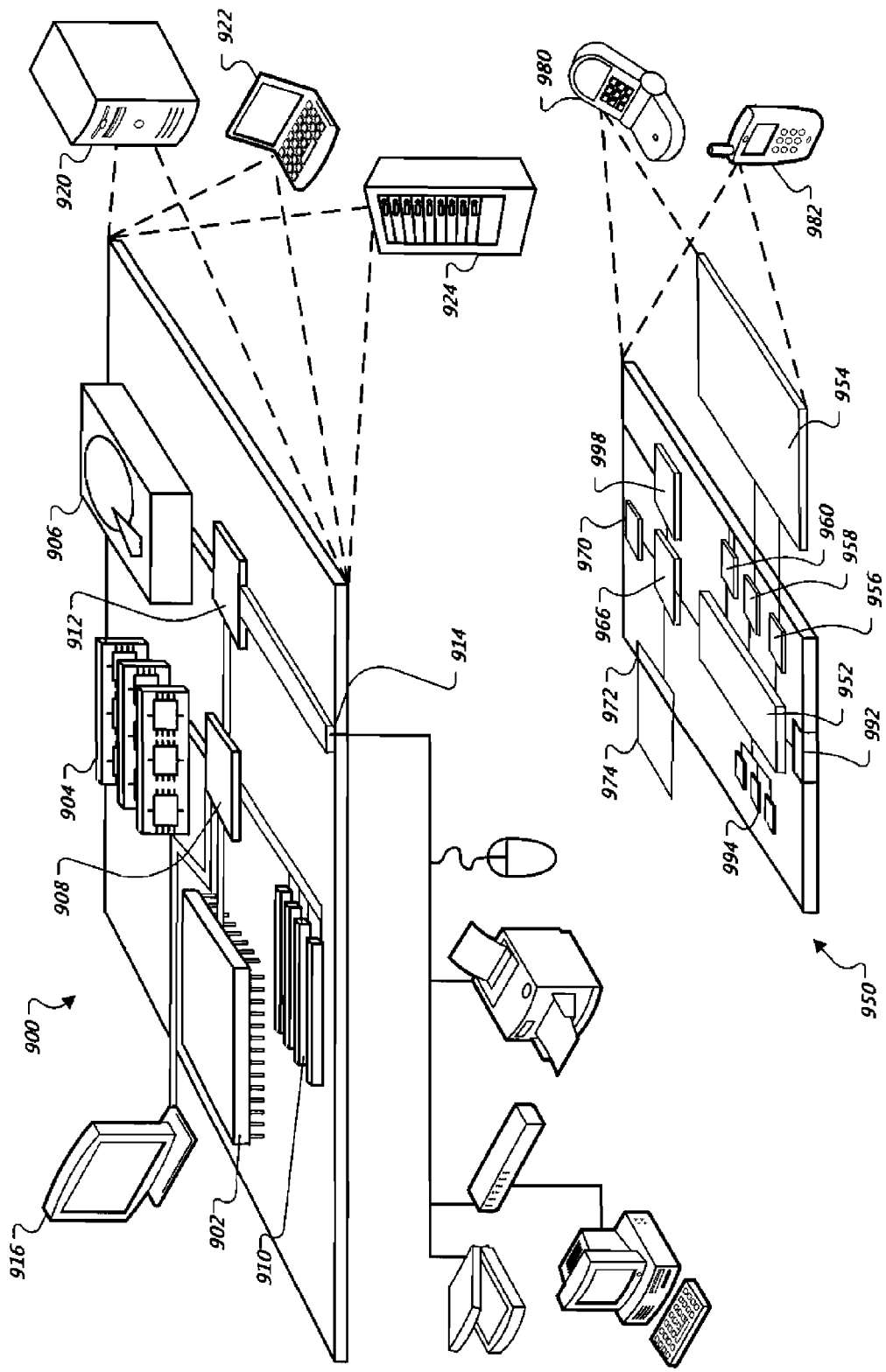
FIG. 9 shows an example of a computer device and a mobile computer device that can be used to implement the techniques described here.

FIG. 9 shows an example of a computer device 900 and a mobile computer device 950 that can be used to implement the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, memory on processor 902, or a propagated signal.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) display or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made. For example, various forms of the flows shown above may be used, with steps re-ordered, added, or removed. Also, although several applications of the electronic program guide systems and methods have been described, it should be recognized that numerous other applications are contemplated. Moreover, although many of the embodiments have been described in relation to electronic program guides, that term should be understood to include various forms of mechanisms for displaying media-related content and scheduling information for such content. Accordingly, other embodiments are within the scope of the following claims.

What is claimed is:

1. A computer-implemented method, comprising:
receiving a search request related to media programming;
displaying a search result having:
(a) a list of a plurality of programs that share at least a portion of a same title and that are responsive to the search request, wherein particular entries in the list each represent an episode of a program and a time at which the episode is to be played; and
(b) a schedule grid displaying a plurality of programs on a plurality of different channels for a time period, including two or more of the episodes of programs responsive to the search request, wherein the schedule grid is defined by a time axis and a channel axis, and wherein the list of the plurality of programs and the schedule grid are displayed simultaneously next to each other in portions of a display area distinct from each other;
receiving from the user a selection of an episode of a program in the list of a plurality of programs, wherein the episode is displayed in one of the plurality of programs in the list before it is selected but is scheduled outside the time period and therefore not displayed on the schedule grid before it is selected;
identifying a channel that corresponds to the selected episode and a showing time that corresponds to the selected episode;
automatically changing the time period of the schedule grid, in response to receiving the selection of the episode of the program in the list, to an updated time period that includes the showing time of the selected episode of the program and the channel so as to display the episode of the program in the schedule grid, the automatic change of the time period being based on the identifying the channel that corresponds to the selected episode and the showing time that corresponds to the selected episode; and
wherein receiving the search request and generating the search result are performed by one or more programmable processors of one or more computers.

2. The method of claim 1, wherein the list contains a subset of collections of programs responsive to the search request, and further comprising displaying a control whose selection causes the display of additional collections of programs responsive to the search request.

3. The method of claim 1, wherein the plurality of programs are organized by one or more categories selected from a group consisting of channel, genre, and program.

4. The method of claim 1, further comprising receiving a selection of one or more other programs in the list or the schedule grid and displaying program details associated with the selected one or more other programs.

5. The method of claim 4, wherein the program details are displayed in a pop up box over the list or the schedule grid.

6. The method of claim 4, wherein the program details are displayed in a display pane separate from a pane displaying the list and the schedule grid.

7. The method of claim 6, wherein the program details are comprised of results obtained from a plurality of information corpuses.

8. The method of claim 6, wherein the program details include information about a plurality of actors in the selected other program.

9. The method of claim 8, further comprising receiving a selection of one of the plurality of actors and generating a search result on the selected actor.

10. The method of claim 9, further comprising generating a map of actor casting connections for one or more of the plurality of actors.

11. The method of claim 6, further comprising generating controls for selecting a plurality of follow-up actions for the selected other program.

12. The method of claim 11, wherein the plurality of follow-up actions include one or more actions selected from the group consisting of e-mailing program information, establishing a recording of the other program, and adding the other program to a personal or shared calendar.

13. The method of claim 1, further comprising receiving a selection commenting on one of the programs responsive to the search request and making the comment available to a network of users associated with an information provider.

14. The method of claim 1, wherein the one or more programs in the schedule grid responsive to the search request are displayed in a format that contrasts with programs in the schedule grid that are not responsive to the search request.

15. The method of claim 1, wherein the plurality of different channels include station identifications.

16. The method of claim 1, wherein the plurality of different channels include a personalized channel.

17. The method of claim 1, further comprising generating a time bar for display across a spatial dimension of the schedule grid that allows a user to select a new time period, the time bar having a time axis that does not match the time period of the schedule grid.

18. The method of claim 1, further comprising, before generating the search results, determining a head-end for a user and asking the user for head-end related information if a head-end cannot be determined.

19. A computer-implemented system for generating media programming information, comprising:
an interface to receive requests for media programming content;
a programming database storing information about schedules for a large plurality of media programs; and
a page formatter programmed to:
generate code for displaying a plurality of media-related search results in one or more groupings next to a programming guide grid that includes two or more of the media-related search results, wherein the programming guide grid is defined by a time axis and a channel axis, wherein the media-related search results and the programming guide grid are displayed next to each other in portions of a display area that are distinct from each other;
receive a selection of one of the media-related search results in the plurality of media-related search results, wherein the selected media-related search result comprises an episode of a program that, before it is selected (a) is displayed in the groupings next to the programming guide grid, but (b) has a viewing time that is outside of a time period which is outside a time period shown in the displayed programming guide grid;
identify a channel that corresponds to the selected media-related search result and a showing time that corresponds to the selected media-related search result; and automatically change the time period of the programming guide grid, in response to receiving the selection of the media-related search result, to an updated time period that includes the showing time and the channel of the selected media-related search result so as to display the selected media-related search result in the programming guide grid, the automatic change of the time period being based on the identifying the channel that corresponds to the selected media-related search result and the showing time that corresponds to the selected media-related search results.

20. The system of claim 19, further comprising a media streamer to provide streaming media content in response to selection of a program on the programming guide grid.

21. A computer-implemented method, comprising:
receiving a search request related to media programming; and
generating a search result having:
(a) a list of a plurality of programs that share at least a portion of a same title and are responsive to the search request, wherein particular entries in the list represent an episode of a program and a time at which the episode is to be played; and
(b) a schedule grid displaying a plurality of programs on a plurality of different channels for a time period, including two or more of the episodes of programs responsive to the search request, wherein the included episodes of programs responsive to the search request are displayed in the schedule grid in a format that contrasts with programs in the schedule grid that are not responsive to the search request; and
wherein the list of the plurality of programs and the schedule grid are simultaneously generated for display next to each other in portions of a display area distinct from each other; and
wherein receiving the search request and generating the search result are performed by one or more programmable processors of one or more computers.

* * * * *

UNITED STATES PATENT AND TRADEMARK OFFICE
CERTIFICATE OF CORRECTION

PATENT NO.       : 8,631,440 B2                                                        Page 1 of 1
APPLICATION NO.  : 11/742183
DATED            : January 14, 2014
INVENTOR(S)      : Gossweiler, III et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 277 days.

Signed and Sealed this
Thirtieth Day of May, 2017

Michelle K. Lee
*Director of the United States Patent and Trademark Office*